US009479382B1

(12) United States Patent
Ward, Jr.

(10) Patent No.: US 9,479,382 B1
(45) Date of Patent: Oct. 25, 2016

(54) EXECUTION PLAN GENERATION AND SCHEDULING FOR NETWORK-ACCESSIBLE RESOURCES

(75) Inventor: David John Ward, Jr., Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 403 days.

(21) Appl. No.: 13/431,393

(22) Filed: Mar. 27, 2012

(51) Int. Cl.
*G06F 15/173* (2006.01)
*H04L 29/06* (2006.01)
*H04L 29/08* (2006.01)
*G06Q 30/08* (2012.01)

(52) U.S. Cl.
CPC ............... *H04L 29/06* (2013.01); *G06Q 30/08* (2013.01); *H04L 29/08* (2013.01)

(58) Field of Classification Search
CPC ..... G06F 9/46; G06F 9/50; H04L 29/08144; G06Q 10/06; G06Q 10/06316; G06Q 30/0283
See application file for complete search history.

(56) References Cited

U.S. PATENT DOCUMENTS

| | | | |
|---|---|---|---|
| 5,692,174 A * | 11/1997 | Bireley | G06F 17/30445 |
| 6,421,728 B1 | 7/2002 | Mohammed et al. | |
| 6,493,685 B1 | 12/2002 | Ensel et al. | |
| 7,412,538 B1 | 8/2008 | Eytchison et al. | |
| 7,637,426 B1 | 12/2009 | Green | |
| 7,743,001 B1 | 6/2010 | Vermeulen et al. | |
| 7,768,920 B2 | 8/2010 | Goshen et al. | |
| 7,870,044 B2 | 1/2011 | Robertson | |
| 8,024,225 B1 | 9/2011 | Sirota et al. | |
| 8,055,493 B2 | 11/2011 | Rolia et al. | |
| 8,595,191 B2 * | 11/2013 | Prahlad | G06F 17/30091 707/654 |
| 8,615,584 B2 | 12/2013 | Dawson et al. | |
| 2003/0028642 A1 | 2/2003 | Agarwal et al. | |
| 2003/0088482 A1 | 5/2003 | Blumberg | |
| 2003/0126196 A1 | 7/2003 | Lagimonier et al. | |
| 2003/0229529 A1 | 12/2003 | Mui et al. | |
| 2004/0030740 A1 | 2/2004 | Stelting | |
| 2004/0243430 A1 | 12/2004 | Horstemeyer | |
| 2006/0152756 A1 * | 7/2006 | Fellenstein | G06Q 40/04 358/1.15 |
| 2006/0159014 A1 | 7/2006 | Breiter et al. | |
| 2007/0219837 A1 | 9/2007 | Lu et al. | |

(Continued)

OTHER PUBLICATIONS

"Amazon EC2 Spot Instance," Amazon Web Services LLC, Downloaded Mar. 26, 2012, 11 pages.

(Continued)

*Primary Examiner* — Joshua Joo
*Assistant Examiner* — Younes Naji
(74) *Attorney, Agent, or Firm* — Robert C. Kowert; Meyertons, Hood, Kivlin, Kowert & Goetzel, P.C.

(57) ABSTRACT

Methods and apparatus for deadline-based pricing and scheduling of network-accessible resources are disclosed. A system includes resources organized into a plurality of pools, and a resource manager. The resource manager receives a task execution query comprising a specification of a task to be performed for the client. The specification includes the task's deadline and a budget constraint. In response, the resource manager generates a task execution plan comprising using a resource from a selected pool to perform at least part of the task, where the pool is selected based at least partly on a pricing policy of the pool. In response to an implementation request for the task, the resource manager schedules at least a part of the task using a particular resource from the selected pool.

24 Claims, 13 Drawing Sheets

(56) References Cited

U.S. PATENT DOCUMENTS

| | | | |
|---|---|---|---|
| 2008/0080396 | A1 | 4/2008 | Meijer et al. |
| 2008/0103848 | A1 | 5/2008 | Santos et al. |
| 2008/0167928 | A1 | 7/2008 | Cao et al. |
| 2008/0243666 | A1 | 10/2008 | Rowan |
| 2009/0049114 | A1 | 2/2009 | Faraj |
| 2009/0182598 | A1 | 7/2009 | An et al. |
| 2009/0276771 | A1 | 11/2009 | Nickolov et al. |
| 2009/0281952 | A1 | 11/2009 | Toffey et al. |
| 2009/0300635 | A1 | 12/2009 | Ferris |
| 2010/0010657 | A1 | 1/2010 | Do et al. |
| 2010/0050172 | A1 | 2/2010 | Ferris |
| 2010/0070397 | A1 | 3/2010 | Hahn-Carlson et al. |
| 2010/0131624 | A1 | 5/2010 | Ferris |
| 2010/0131649 | A1 | 5/2010 | Ferris |
| 2010/0217865 | A1 | 8/2010 | Ferris |
| 2010/0241479 | A1* | 9/2010 | Chaushev ...... G06Q 10/063114 705/7.15 |
| 2010/0306379 | A1 | 12/2010 | Ferris |
| 2011/0119104 | A1 | 5/2011 | Levine et al. |
| 2011/0131335 | A1 | 6/2011 | Spaltro et al. |
| 2011/0137805 | A1 | 6/2011 | Brookbanks et al. |
| 2011/0138050 | A1 | 6/2011 | Dawson et al. |
| 2011/0138051 | A1 | 6/2011 | Dawson et al. |
| 2011/0145094 | A1* | 6/2011 | Dawson ................ G06F 9/5027 705/26.63 |
| 2011/0145392 | A1 | 6/2011 | Dawson et al. |
| 2011/0154353 | A1* | 6/2011 | Theroux ............... G06F 9/5038 718/104 |
| 2011/0161964 | A1 | 6/2011 | Piazza et al. |
| 2011/0173038 | A1 | 7/2011 | Moon et al. |
| 2011/0173626 | A1 | 7/2011 | Chi et al. |
| 2011/0179132 | A1 | 7/2011 | Mayo et al. |
| 2011/0202657 | A1 | 8/2011 | Chang |
| 2011/0213691 | A1 | 9/2011 | Ferris et al. |
| 2011/0213712 | A1 | 9/2011 | Hadar et al. |
| 2011/0238458 | A1 | 9/2011 | Purcell et al. |
| 2011/0295986 | A1 | 12/2011 | Ferris et al. |
| 2011/0295998 | A1 | 12/2011 | Ferris |
| 2011/0296025 | A1 | 12/2011 | Lieblich et al. |
| 2012/0016721 | A1* | 1/2012 | Weinman ............... G06Q 10/06 705/7.35 |
| 2012/0131161 | A1 | 5/2012 | Ferris et al. |
| 2012/0159506 | A1* | 6/2012 | Barham ................ G06F 9/5044 718/104 |
| 2012/0173725 | A1* | 7/2012 | Verma ................... G06F 9/5027 709/225 |
| 2012/0198462 | A1* | 8/2012 | Cham ................... G06F 9/5038 718/103 |
| 2013/0111027 | A1 | 5/2013 | Milojicic et al. |
| 2013/0173418 | A1 | 7/2013 | Goad et al. |
| 2013/0212279 | A1 | 8/2013 | Dutta et al. |
| 2013/0232252 | A1 | 9/2013 | Huang et al. |
| 2013/0238785 | A1 | 9/2013 | Hawk et al. |
| 2013/0246208 | A1* | 9/2013 | Jain .......................... G06F 9/50 705/26.3 |

OTHER PUBLICATIONS

"Amazon EC2 Instance Types," Amazon Web Services LLC, Downloaded Mar. 26, 2012, 5 pages.

"Amazon EC2 Reserved Instances," Amazon Web Services LLC, Downloaded Mar. 26, 2012, 6 pages.

"Amazon EC2 Instance Purchasing Options," Amazon Web Services LLC, Downloaded Mar. 26, 2012, 2 pages.

"Amazon EC2 Pricing," Amazon Web Services LLC, Downloaded Mar. 26, 2012, 8 pages.

Amazon Web Services, "Discussion Forums; Existing Connections Dropped Rudely when Instance Taken out of ELB", Eric Hammond, Feb. 25, 2011, pp. 1-4.

Amazon Web Services, "Amazon Elastic Compute Cloud (Amazon EC2)", Mar. 24, 2011, pp. 1-26.

Amazon Web Services, "Amazon EC2 Pricing", Feb. 28, 2011, pp. 1-13.

Amazon Web Services, "Amazon EC2 Spot Instances", Feb. 24, 2011, pp. 1-5.

Amazon Web Services, "Amazon CloudWatch", Feb. 24, 2011, pp. 1-5.

U.S. Appl. No. 13/535,720, filed Jun. 28, 2012, Matthew D. Klein, et al.

U.S. Appl. No. 13/535,715, filed Jun. 28, 2012, Matthew D. Klein, et al.

U.S. Appl. No. 13/535,707, filed Jun. 28, 2012, Matthew D. Klein, et al.

U.S. Appl. No. 13/535,725, filed Jun. 28, 2012, Matthew D. Klein, et al.

AWS Documentation, "Using Cluster Instances," downloaded from docs.amazonwebservices.com/AWSEC2/latest/UserGuide/using_cluster_computing.html on May 16, 2012, pp. 1-6.

Amazon Web Services: AWS Products & Solutions, "High Performance Computing (HPC) on AWS," downloaded from aws.amazon.com/hpc-applications/ on May 16, 2012, pp. 1-3.

Timo Schneider (personal website), "An Oblivious Routing Congestion Simulator," downloaded from perlplexity.org/Research/ORCS/ on May 16, 2012, pp. 1-8.

U.S. Appl. No. 13/431,379, filed Mar. 27, 2012, David John Ward, Jr.

U.S. Appl. No. 13/431,388, filed Mar. 27, 2012, David John Ward, Jr., et al.

U.S. Appl. No. 13/429,957, filed Mar. 26, 2012, David John Ward, Jr., et al.

U.S. Appl. No. 13/431,355, filed Mar. 27, 2012, David John Ward, Jr.

U.S. Appl. No. 13/429,985, filed Mar. 26, 2012, David John Ward, Jr., et al.

U.S. Appl. No. 13/431,348, filed Mar. 27, 2012, David John Ward, Jr.

U.S. Appl. No. 13/431,360, filed Mar. 27, 2012, David John Ward, Jr.

U.S. Appl. No. 13/430,003, filed Mar. 26, 2012, David John Ward, Jr., et al.

U.S. Appl. No. 13/475,399, filed May 18, 2012, David John Ward, Jr.

U.S. Appl. No. 13/475,359, filed May 18, 2012, David John Ward, Jr.

U.S. Appl. No. 13/461,605, filed May 1, 2012, David John Ward, Jr., et al.

U.S. Appl. No. 13/476,828, filed May 21, 2012, David John Ward, Jr., et al.

U.S. Appl. No. 13/475,461, filed May 18, 2012, David John Ward, Jr., et al.

U.S. Appl. No. 13/331,750, filed Dec. 20, 2011, Amazon Technologies, Inc., all pages.

Agarwal, Sharad, et al. "Volley: Automated Data Placement for Geo-Distributed Cloud Services." 2010, pp. 1-16.

* cited by examiner

Task Query Submission Form Page https://<website>.com/taskQueryForm

To help us generate the optimal execution plan, ← 703
please provide as many details as you can below.

You must specify either a task completion deadline, a task budget, or both!

Task-level information

| Field | Value | |
|---|---|---|
| Task ID (for previously-created tasks) | Leave blank if this is the first query for the task. | ← 705 |
| Task description | | ← 707 |
| Task type (e.g., compute/dataTransfer/mixed) | Compute (default) | ← 709 |
| Task executable type | JDK 1.6 JAR file (default) | ← 711 |
| Task completion deadline | | ← 713 |
| Task budget target or goal | Get me the cheapest plan (default) | ← 715 |
| Preferred availability zone | AZ-U.S. East Coast-003 (Default) | ← 717 |
| Preferred instance types (Reserved/On-demand/spot) | Any (default) | ← 719 |
| Preferred interruptibility level | Interruptible and idempotent (default) | ← 721 |
| Instance count/size | Any (default) | ← 723 |
| Data transfer requirements | Any (default) | ← 724 |
| Auto-generate subtasks? | Yes (default) | ← 725 |
| Auto-schedule subtasks? | Yes (default) | ← 727 |

Click to specify subtask details ← 729

Next
↑
731

SubTask Detail Submission Form Page https://<website>.com/subTaskDetails

Please provide as much information as you can about ← 803
subtask 0001 below.

SubTask 0001 information

| Subtask name | | ← 805 |
| Subtask description | | ← 807 |
| Subtask type (e.g., compute/dataTransfer) | Compute (default) | ← 809 |
| Subtask executable | | ← 811 |
| Subtask interruptibility setting | Interruptible (default) | ← 813 |
| Subtask performance requirement | Small instance (default) | ← 815 |
| Preferred availability zone | AZ-U.S. East Coast-003 (Default) | ← 817 |
| Subtask depends on these other subtasks | None (default) | ← 819 |
| Subtask budget limit | None (use overall task budget) | ← 821 |
| Subtask timing constraint | None (use overall task budget) | ← 823 |

[Click to specify next subtask details] ← 829

[Done with subtasks] ← 831

*Figure 8*

EXECUTION PLAN GENERATION AND SCHEDULING FOR NETWORK-ACCESSIBLE RESOURCES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

In many environments, operators of provider networks that implement different types of virtualized computing, storage, and/or other network-accessible functionality allow customers to reserve or purchase access to resources in any of several different resource acquisition modes. For example, a customer may reserve a virtual compute resource instance for a relatively long duration, such as one year or three years, or a customer may purchase resources for shorter terms on an ad-hoc basis as needed. For some types of resource reservations, at least a portion of the price paid by the customer may fluctuate over time in response to changing demand and supply of the resources within the provider network. The provider network operator may have to try to ensure that a number of potentially competing demands are met, e.g., that all guaranteed commitments to clients (such as long-term reservations that have already been paid for) are honored, that the dynamically-varying component of resource pricing does not get so high that customer satisfaction suffers, that the provider's data center investment is justified by a reasonable level of resource utilization and revenue, and so on. Depending on customer budgets, at least for certain types of typically long-running applications for which the major execution constraint is that the application should ideally be completed before some relatively distant deadline, some customers may be willing to allow the network provider operator flexibility in determining exactly which resources are deployed and when, especially in return for pricing benefits.

BRIEF DESCRIPTION OF THE DRAWINGS

FIG. 7 illustrates a portion of an example web-based interface that may be implemented to allow clients to submit task execution queries, according to some embodiments.

FIG. 8 illustrates a portion of an example web-based interface that may be implemented to allow clients to submit subtask preferences, according to some embodiments.

Figure 1:
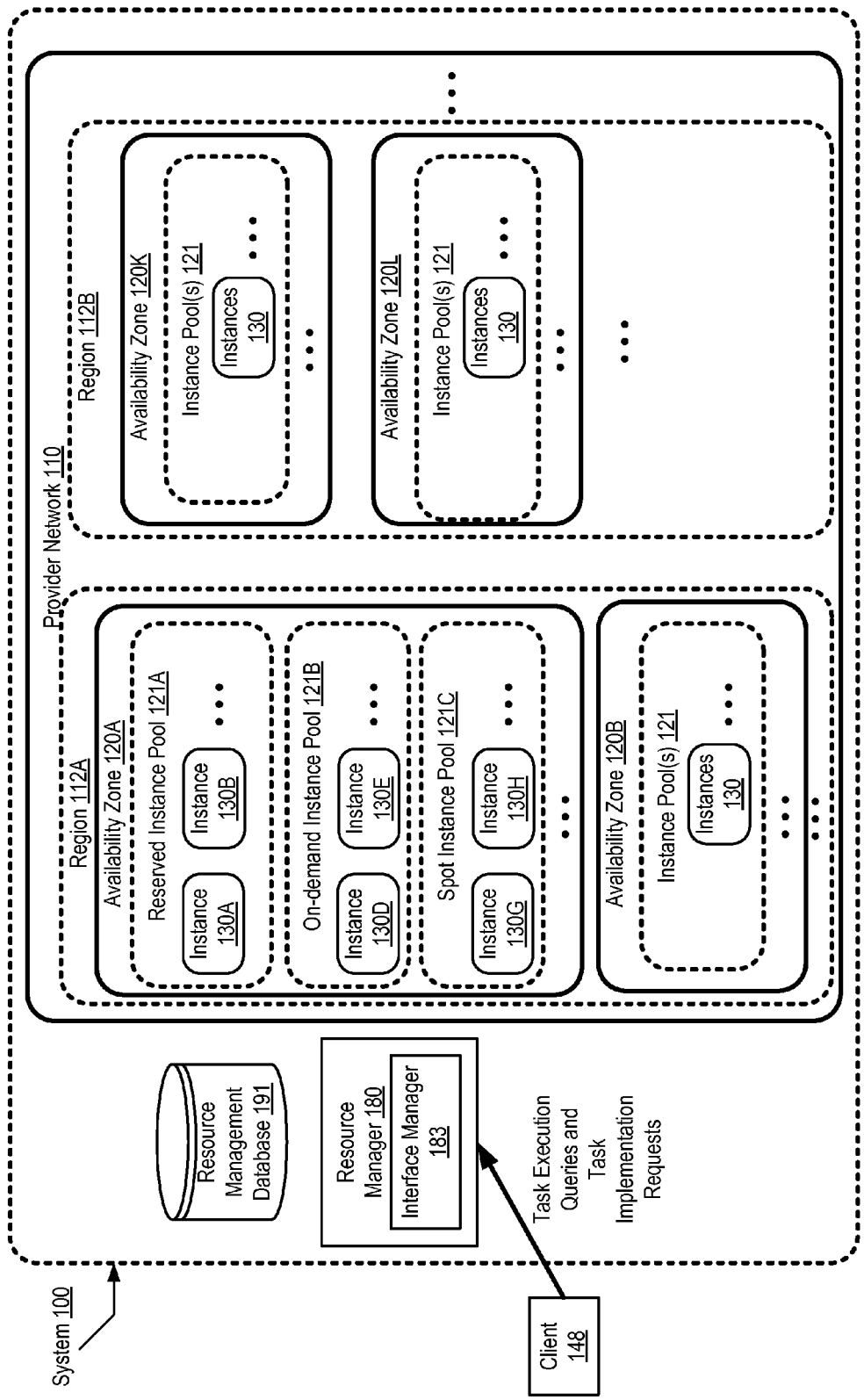
FIG. 1 illustrates an example system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for managing dynamic pricing, reservation and allocation of network-accessible resources are described. Networks set up by an entity such as a company or a public sector organization to provide one or more services (such as various types of cloud-based computing or storage) accessible via the Internet and/or other networks to a distributed set of clients may be termed provider networks in this document. Such a provider network may include numerous data centers hosting various resource pools, such as collections of physical and/or virtualized computer servers, storage devices, networking equipment and the like, needed to implement and distribute the infrastructure and services offered by the provider. The resources may in some embodiments be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices and the like.

Operators of such provider networks may in some instances implement a flexible set of resource reservation, control and access interfaces for their clients. For example, a resource manager of the provider network may implement a programmatic resource reservation interface (e.g., via a web site or a set of web pages) that allows clients to learn about, select, purchase access to, and/or reserve resource instances. Such an interface may include capabilities to allow browsing of a resource catalog, provide details and specifications of the different types or sizes of resources supported, the different reservation types or modes supported, pricing models, and so on. The provider network may support several different purchasing modes (which may also be referred to herein as reservation modes) in one embodiment: for example, long-term reservations, on-demand resource allocation, or spot-price-based resource allocation. Using the long-term reservation mode, a client may make a low, one-time, upfront payment for a resource instance, reserve it for a specified duration such as a one or three year term, and pay a low hourly rate for the instance; the client would be assured of having the reserved instance available for the term of the reservation. Using on-demand mode, a client could pay for capacity by the hour (or some appropriate time unit), without any long-term commitments or upfront payments. In the spot-price mode, a client could specify the maximum price per unit time that it is willing to pay for a particular type of resource, and if the client's maximum price exceeded a dynamic spot price determined at least in part by supply and demand, that type of resource would be provided to the client. In some embodiments, dynamically resizable pools of resource instances may be set aside for the different reservation types or modes—e.g., long-term reserved instances may be allocated from one pool, on-demand instances from another, and so on. During periods when the supply of the requested resource type exceeded the demand, the spot price may become significantly lower than the price for on-demand mode. In some implementations, if the spot price increases beyond the maximum bid specified by a client, a resource allocation may be interrupted—i.e., a resource instance that was previously allocated to the client may be reclaimed by the resource manager and may be allocated to some other client that is willing to pay a higher price. Other purchasing modes or combinations of modes may be implemented by the resource manager in some embodiments.

Some clients may wish to take full advantage of the choices available among various pricing options, resource sizes, and the like, and may be willing to specify the details for each of the resource instances that they need. However, for certain types of applications, some clients may not be as concerned about exactly which type of resources are utilized and when, as long as the applications are completed on or before a specified deadline and within a specified budget. For example, scientists or researchers that wish to perform a potentially months-long series of computations using a bioinformatics, physics, or astronomy application may have a fairly limited budget, and may therefore be willing to trade off tight control on resource selection and scheduling in return for lower total costs of the computing. In some cases, clients may simply desire that a given task be completed at the lowest possible cost, regardless of exactly which resources are used or when. Other clients may wish to specify a few constraints—such as the total number and/or sizes of instances to be used, or in the case of data transfer tasks, the total amount of data to be transferred from a specified source to a specified destination—and may wish to leave the selection of the resources to the resource manager. For some clients, allowing a resource manager to select resources and schedule subtasks of the application may be considered a benefit in and of itself, independently of any monetary benefits. Given such flexibility, a resource manager may be able to make more effective scheduling decisions to meet the needs of a wider set of clients—e.g., portions of the long-term computation tasks may be scheduled on resources during periods when the resources are not heavily utilized, and may be paused or suspended when the workload from other customers (who may be willing to pay a higher pricing rate than the scientists or researchers) on those resources increases. In embodiments where the provider network resources are organized into pools with associated pricing policies, the resource instances to be used during any given period of time for the long-term computations may be selected from the appropriate pool, e.g., a spot-instance pool or an on-demand instance pool, based for example on a current pricing of resources of the pool and a current utilization level of the pool.

According to one such embodiment, a resource manager in such an environment may receive a task execution query comprising a specification of a task to be performed for a client, where the specification has an associated target deadline for completion of the task and an associated budget constraint for completion of the task. In response, the resource manager may generate an execution plan for the task, where the plan comprises using a resource of a selected resource pool to perform at least a portion of the task. The resource pool may be selected based at least in part on the pricing policy of the resource pool and an analysis of the task specification. Other factors may also be taken into consideration in selecting the resource pool or resource type, such as whether the task or its subtasks can be resumed after an interruption without excessive overhead, and so on. The resource manager may provide an indication of the execution plan to the client in some embodiments, e.g., in order to receive an approval of the plan. The resource manager may then schedule an execution of at least a portion of the task on a resource from the selected resource pool.

In one simple scenario, the entire task may be scheduled as one unit of work, and after the task completes, the client may be notified of the task completion. In many scenarios, however, the task may be split into smaller subtasks, either based on explicit subtask boundaries defined by the client, or based on automated subtask generation by the resource manager. In one embodiment, the client may be provided the opportunity to either specify the details of each subtask, or opt in to an automated subtask scheduling option. Clients may specify various task and subtask properties in different embodiments, such as for example the interruptibility characteristics of the task or of individual subtasks, whether any or all of the sub-tasks can be run in parallel, performance requirements or desired resource sizes for the task or subtasks, and so on. In some embodiments deadlines and or budget constraints may be specified at the subtask level as well as or instead of at the task level.

In some embodiments the provider network may be organized into a plurality of geographical regions, and each region may include one or more availability zones. An availability zone in turn may comprise one or more distinct locations or data centers, engineered in such a way that the resources in a given availability zone are insulated from failures in other availability zones. That is, a failure in one availability zone may not be expected to result in a failure in any other availability zone; thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster). In some implementations clients may also be able to specify preferred availability zones for their tasks and/or subtasks.

The resource manager may use the specified preferences and properties, the target deadline(s) as well as budget constraints in its attempt to identify the most suitable resources and/or resource pools for the client's tasks and/or subtasks. In some embodiments the resource manager may be configured to utilize resource usage history to help in resource selection and scheduling. For example, if the client has previously scheduled similar tasks, the resource manager may be able to use metrics gathered for the earlier tasks (such as whether and when tasks or subtasks were interrupted and restarted) to deduce interruptibility of the current tasks, which may in turn allow the resource manager to make better pool selection decisions. If the resource manager is able to determine that the subtasks of a client are idempotent and can be resumed without significant overhead, cheaper spot resource instances (which can be interrupted at short notice or without notice) may be an appropriate choice instead of potentially more expensive on-demand instances. In some embodiments, even if the client does not explicitly indicate that subtasks can be performed in parallel, the resource manager may be able to analyze the task specification provided by a client (or the client's resource usage history) and determine whether any subtasks can in fact be executed in parallel. Similarly, in some embodiments the resource manager may be able to identify the performance ratings of the resources that may be needed for a task or subtask based on an analysis of the task specification and/or based on resource usage history.

In some embodiments several different types of tasks and sub-tasks may be schedulable by the resource manager. For example, in one embodiment the resource manager may be capable of scheduling data transfer tasks and subtasks, as well as compute tasks and subtasks. Whereas a compute task may require a successful execution of one or more applications, a data transfer task may (as its name implies) comprise the movement of a specified data set from a source device to a destination device. For example, a provider of online videos may wish to replicate or copy large video data sets from one set of storage devices at one data center of the provider network, to another data center, and may wish to take advantage of the cost savings available by allowing the resource manager to schedule the transfer of the data over time, as long as an overall deadline is met. A source or destination device for a data transfer task or subtask may be within the provider network, or may form part of a client network (i.e., the source or destination may be located at premises or data centers controlled managed or owned by the client). In some embodiments a client task may comprise both compute subtasks and data transfer subtasks.

A variety of different techniques may be used for data transfer tasks or subtasks in different embodiments. For example, for data transfers between client network devices and provider network resources, the resource manager may have the option of using (a) a network path that is shared or sharable by multiple clients (b) a network path that is dedicated for use by one client and includes a direct physical link installed at client request between the client's network equipment and the provider network's equipment, which may be referred to as private network paths or "direct-connect" paths or (c) a transfer of portable physical storage device such as a removable disk drive, DVD, or the like.

In one embodiment the resource manager may support several different types of task execution queries. As noted above, some task execution queries may specify both a time constraint such as a deadline, and a budget constraint, and the resource manager may in response generate an execution plan intended to meet both those constraints. In a second types of task execution query, a client may specify a budget constraint and provide a task specification, and in effect ask the resource manager "How soon can you complete the specified task within this budget limit"? In a third type of task execution query, a client may specify a time constraint and in effect ask the resource manager "What is the lowest cost that you can quote for completing this task within these time constraints"? In some embodiments, another supported query type may simply request that the resource manager generate the execution plan with the lowest estimated execution cost, e.g., without a specified budget limit or even a specified deadline. Yet another query type may specify a required or minimum number of resource instances to be acquired for the task, independently of which locations the instances are in. Other query types may be supported as well, such as a request to transfer a specified data set, with no specific deadline or target budget. For each type of query, the resource manager may analyze the task specification describing the work required, as well as any other properties or characteristics specified by the client, and make a best-effort attempt to obtain an answer to the client's query.

The client may in some embodiments use an interface (such as web page or pages, an application programming interface or API, or a command-line interface) implemented by an interface manager (which may be incorporated within the resource manager in some implementations) to specify task execution queries. By changing the parameters and constraints, the client may be able to try out a variety of different "what-if" scenarios before agreeing to a particular execution plan. In some embodiments, clients may be able to view the current execution status of their tasks or subtasks using the interface. In some embodiments, additional information about executed tasks and subtasks may be available via the interface or interfaces, such as program output, error logs, exception logs, and so on.

Example System Environment

FIG. 1 illustrates an example system environment, according to at least some embodiments. The system 100 includes a provider network 110 comprising a plurality of geographical regions such as regions 112A and 112B. Each geographical region 112 may include one or more availability zones 120, such as availability zones 120A and 120B in region 112A, and availability zones 120K and 120L in region 112B. Each availability zone 120 may in turn include a plurality of resources such as resource instances 130A, 130B, 130D, 130E, 130G and 130H in availability zone 120A. The instances may be organized into various resource pools in some embodiments, such as reserved instance pool 121A, on-demand instance pool 121B, and spot instance pool 121C. The various resource instances 130 in the different availability zones 120 may be reserved and/or allocated for use by clients 148. Each instance pool 121 may have associated resource management and pricing policies, governing for example whether a reservation or allocation of a resource instance can be interrupted, whether reservations of one client can be resold to another, the different types of static and dynamic pricing rates in effect for instances of the pool, and so on. For clarity, the various types of instance pools 121 that may be implemented are shown only for availability zone 120A in FIG. 1; the other availability zones may have their own sets of instance pools 121. Not all the availability zones may implement the same sets of pools: for example, some availability zones may implement only reserved instance pools and on-demand pools, and may not implement a spot instance pool. In some embodiments other instance pools not shown in FIG. 1 may be implemented, such as an "available instance" pool comprising currently idle instances, from which instances may be moved to other pools in response to instance enablement requests. It is noted that the pools may represent logical collections or aggregations, so that, for example, the presence of two instances in the same pool or sub-pool may not necessarily imply anything about the physical location of the hardware used for the two instances.

In the illustrated embodiment, system 100 includes a resource manager 180 operable to perform a variety of operations in response to requests submitted by clients 148. An interface manager component 183 of the resource manager 180 may in some embodiments implement one or more programmatic interfaces allowing clients 148 to submit task execution queries in which task specifications, goals, requirements, deadlines, and/or budget constrains are specified, and respond to such requests by generating task execution plans, as described below in further detail. In some embodiments, instead of being included within the resource manager 180, the interface manager 183 may be implemented externally. If an acceptable task execution plan is found, the resource manager 180 may schedule the tasks in accordance with the plans, using resources 130 selected from one or more pools 121 at one or more availability zones 120. In some embodiments the resource manager 180 may wait for a task implementation request from the client before initiating the task. The interface implemented by the resource manager 180 may also support a variety of other functionality—e.g., allowing clients to search for, browse, reserve and acquire desired types of instances 130 to obtain various types of services, e.g., to run and/or access various applications. Although the instances 130 illustrated in FIG. 1 are shown as belonging to availability zones 120, in other embodiments the provider network 110 may be organized differently: e.g., in some embodiments availability zones may not be implemented. Instance pools may be implemented within availability zones in some implementations (e.g., each availability zone may have its own reserved instance pool), while in other implementations an instance pool or sub-pool may span multiple availability zones.

As indicated in FIG. 1, the resource manager 180 may receive task execution queries of various types from clients 148. In one type of query, the client may specify task specifications such as the executable program or programs to be used, a deadline by which the task is to be completed, and a budget constraint indicating for example a maximum amount the client is willing to pay for completion of the task. Queries which simply request that the resource manager respond with the lowest-estimated-cost execution plan may be supported in some embodiments, e.g., without a specified deadline or a specified budget limit being indicated by the client. In another embodiment, clients may specify a required or minimum number of resource instances (the types/sizes of instances needed may also be specified in some cases) for the task, without indicating specific availability zones or other location details of the instances. For data transfer tasks, in some embodiments the data set to be transferred may be specified, as well as source/destination information, e.g., without specific budget limits or deadlines. In response, the resource manager 180 may generate one or more execution plans for the task, using the information provided by the client in the request, as well as additional sources of information such as the pricing and/or interruptibility polices in effect for the various resource pools 121, and in some cases resource usage data. The resource usage data (which may be retrieved from resource management database 191 in some embodiments) may for example include the requesting client's past task execution history, resource utilization and billing history, and overall resource usage trends for a given set of instances 130 that may be usable for the client's tasks. In some cases the resource manager may use past resource usage data and trends for a given set of resource instances to develop projections of future resource usage, and use these projections in developing the execution plan or plans. Based on an analysis of the task specification and information from some or all of these additional data sources, the resource manager 180 may select one or more resource pools 121 to perform at least a portion of the task as part of an execution plan. In some embodiments, the resource manager 180 may send a notification of an execution plan to the client 148. In response to a task implementation request from the client 148, the resource manager 180 may schedule and/or initiate at least a portion of the task at a resource instance from a pool identified for the execution plan. In some embodiments a task implementation request separate from the task execution query may not be required—i.e., if the resource manager 180 can find an execution plan that meets the various constraints indicated in the execution query, the execution plan may be initiated without further interaction with the client 148.

In some embodiments the interface implemented by the interface manager 183 or the resource manager 180 may allow the client 148 to specify various preferences or suggestions that may be useful in generating the execution plans. For example, in one embodiment the client 148 may specify details of subtasks into which the task can be divided, e.g., for finer grained scheduling. If the client is willing to let the resource manager 180 partition the task into subtasks, a preference or setting for automated subtask generation may be specified instead. For example, in some cases the client's applications may conform to a well-known execution pattern or industry standard methodology (such as the map-reduce programming framework or one of various parallel programming approaches that use the message passing interface or MPI), and the resource manager 180 may be able to determine subtask boundaries as a result of analyzing the task specification or description provided by the client. Interruptibility settings or preferences for the task or subtasks may be included in the execution query in some embodiments. If the nature of the task application or applications is such that a given task or subtask may be paused and then later resumed without substantial overhead or redo work required, the task may be suitable for spot instances, for example; and conversely, if it is difficult to save task or subtask state for resumption, or if the entire task has to be repeated if it is interrupted, the task may be more suitable for on-demand instances or reserved instances. In some embodiments the resource manager 180 may be able to deduce interruptibility characteristics, e.g., based on analyzing the task specification, analysis of previously submitted tasks, or other factors, instead of relying on the client to provide interruptibility preferences. In some cases, the choice of the specific pool to be used for a client's task may be made based largely on the deadline and price rather than on interruptibility—e.g., even if a client's task can be resumed after interruption with relatively small overhead, it may be advisable to use a non-interruptible instance such as an on-demand instance instead of a spot instance, simply because the task deadline is close and even the small interruptibility overhead may potentially cause the deadline to be missed.

Clients 148 may also specify parallelizability characteristics of their applications in some embodiments, e.g., indicating whether some or all sub-tasks can be run in parallel if sufficient resources are available. In one embodiment, as in the case of interruptibility characteristics discussed above, the resource manager may be able to analyze the task specification to identify whether any sub-tasks are parallelizable. The preferred performance ratings of resources to be used for various tasks or subtasks may also be specified via the interface in some embodiments, e.g., the client may indicate that resources with performance equivalent to four 3 GHz cores of a particular CPU architecture should be dedicated for a given subtask if possible. If the client 148 does not specify the resource performance requirements, the resource manager 180 may choose the size of the instances to be used, again based on analysis of the task specification and/or resource usage history for similar tasks executed in the past. Location-related preferences (such as availability zones or regions in which the task should be scheduled) may also be provided by the client in some embodiments. The prior resource usage history of the client, as well as data about the locations where the client currently has resources in use or reserved, may also be used to decide instance locations for the client's task execution.

In some embodiments both compute tasks (which require a successful execution of a program executable) and data transfer tasks (which require a specified data set to be successfully transported from a source device to a target device) may be supported. A given task may include compute subtasks as well as data transfer subtasks in such embodiments. In some implementations, data transfer operations may be combined with computation operations in a given subtask or task.

The resource manager 180 may support several types of task execution queries in some embodiments. For example, a client 148 may, instead of supplying a deadline for a task, wish to determine the earliest possible time at which a task can be completed within a given budget constraint. Or, the client 148 may, instead of specifying a budget constraint, wish to determine the cost of completing a task before a target deadline. As noted above, various other types of task execution queries may also be supported in some embodiments: e.g., queries requesting a least-estimated-cost plan, queries requesting plans that include acquiring a specified number and/or type of resource instance, or queries that request plans for data transfers of a specified amount of data or a specific data set. The interface for task execution requests supported by the resource manager 180 may allow clients to specify various different "what-if scenarios" using combinations of such different types of queries before a specific execution plan is chosen or approved for implementation. Once an execution plan is implemented, e.g., by starting an execution of a first compute sub-task or data transfer sub-task, the client 148 may be allowed to view the current status of the execution via the interface in some embodiments.

As subtasks are executed, or even during the execution of a given subtask or task, the resource manager 180 may in some embodiments regenerate or refresh the execution plan, e.g., based on current operational conditions and prices in the provider network. For example, especially for long-running tasks or subtasks, utilization levels or prices may have changed since the initial execution plan was formulated, which may lead the resource manager 180 to modify the plans for the remaining portion of the task. In addition, a given subtask may take longer or use more resources than was estimated when the initial execution plan was generated, which may also influence the scheduling of the remaining subtasks. In some embodiments the resource manager 180 may notify (or obtain approval from) the client 148 when execution plans are to be changed; in other embodiments, as long as the original constraints for pricing and/or timing specified by the client are met, the resource manager 180 may not be obligated to inform the client of changes to the plan.

Resource Instances Categories and Associated Pricing Models

Figure 2A:
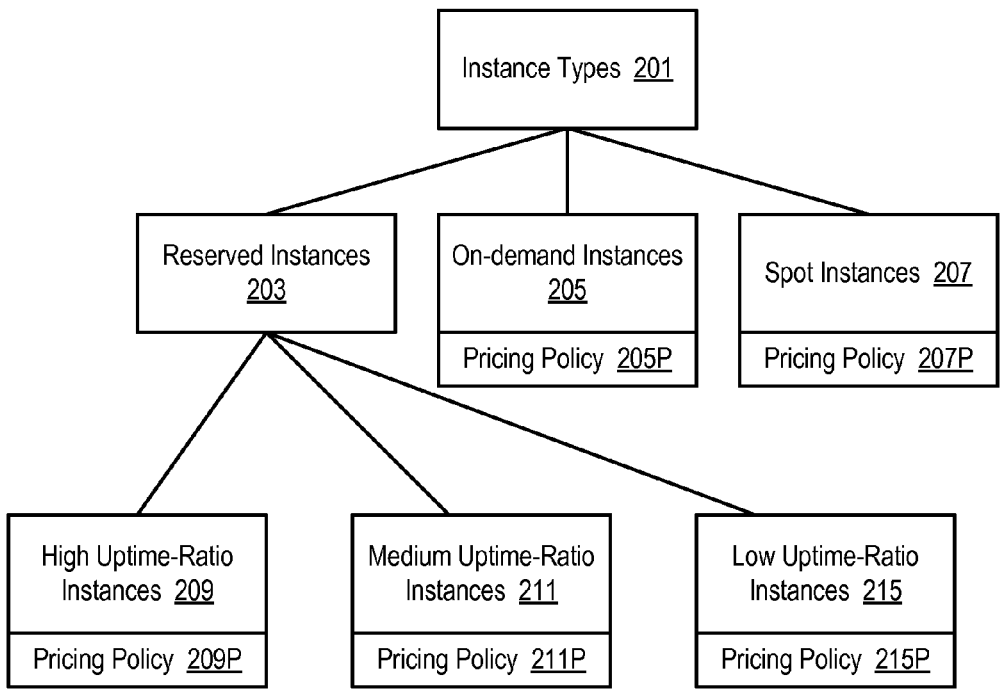
FIGS. 2a and 2b illustrate example resource instance classification approaches, according to at least some embodiments.
Figure 2B:
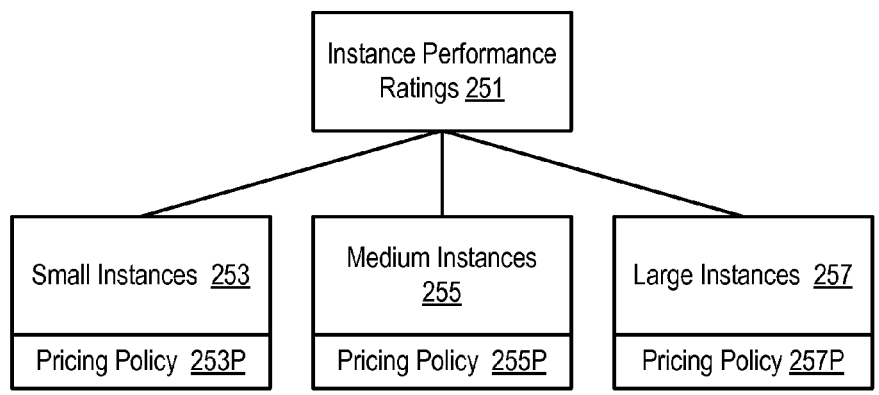

As noted above, the resource instances 130 of a provider network may be grouped into classes or categories based on several different dimensions in some embodiments, and the pricing policies associated with different classes may differ. Some of the categories may be reflected in the manner in which the resources are organized into pools, as indicated in FIG. 1. FIGS. 2a and 2b illustrate example resource instance classification approaches, according to at least some embodiments. FIG. 2a illustrates an approach in which instances are classified based in part on the timing or duration of instance allocations—i.e., on when instances are obtained by clients and when they are released by the clients.

Three high-level types 201 of resource instances are shown: reserved instances 203, on-demand instances 205, and spot-instances 207, each with respective pricing policies 203P, 205P and 207P. In one embodiment, a client 148 may reserve an instance for fairly long periods, such as a one-year term or a three-year term in accordance with the pricing policy 203P, by paying a low, one-time, upfront payment for the instance, and then paying a low hourly rate for actual use of the instance at any desired times during the term of the reservation. Thus, the client 148 may, by making the long-term reservation, be assured that its reserved instance 203 will be available whenever it is needed.

If a client 148 does not wish to make a long-term reservation, the client may instead opt to use on-demand instances 205 (or spot instances 207). The pricing policy 205P for on-demand instances 205 may allow the client 148 to pay for resource capacity by the hour with no long-term commitment or upfront payments. The client 148 may decrease or increase the resource capacity used, based on application needs, and may only have to pay the hourly rate for the instances used. In some cases the per-hour pricing for on-demand instances may be higher than the hourly rate for reserved instances, because the relatively long durations of reservations may provides a more stable revenue stream to the operator of the provider network than the potentially more dynamic revenue stream provided by on-demand instances. Spot instances 207 may provide a third type of resource purchasing and allocation model. The spot pricing policy 307P may allow a client 148 to specify the maximum hourly price that the client is willing to pay, and the resource manager 180 may set a spot price for a given set of resource instances 130 dynamically based on the prices clients are willing to pay and on the number of instances available to support the spot model. If a client 148's bid meets or exceeds the current spot price, an instance may be allocated to the client. If the spot price rises beyond the bid of the client using a spot instance 207, access to the instance by the client may be revoked (e.g., the instance may be shut down).

The prices of reserved instances 203, on-demand instances 205, and spot instances 207 may also vary based on the availability zones 120 or geographic regions in which the instances are located. The operator of provider network 110 may have had to pay different costs for setting up data centers in different physical locations, and may have to pay varying location-dependent ongoing costs for infrastructure and maintenance services such as network connectivity, cooling and so on, which may result in different pricing policies for different availability zones and/or regions. Fluctuations in supply and demand may also result in time-varying prices for the different types of instances. Of course, the price for a given long-term reservation may typically remain unchanged once a client completes the reservation.

In some embodiments, reserved instances 203 may be further classified based on expected uptime ratios. The uptime ratio of a particular reserved instance 130 may be defined as the ratio of the amount of time the instance is activated, to the total amount of time for which the instance is reserved. Uptime ratios may also be referred to as utilizations in some implementations. If a client 148 expects to use a reserved instance for a relatively small fraction of the time for which the instance is reserved (e.g., 30%-35% of a year-long reservation), the client may decide to reserve the instance as a Low Uptime Ratio instance 215, and pay a discounted hourly usage fee in accordance with the associated pricing policy 215P. If the client 148 expects to have a steady-state workload that requires an instance to be up most of the time, the client may reserve a High Uptime Ratio instance 211 and potentially pay an even lower hourly usage fee, although in some embodiments the hourly fee may be charged for the entire duration of the reservation, regardless of the actual number of hours of use, in accordance with pricing policy 211P. An option for Medium Uptime Ratio instances 213, with a corresponding pricing policy 213P, may be supported in some embodiments as well, where the upfront costs and the per-hour costs fall between the corresponding High Uptime Ratio and Low Uptime Ratio costs.

Instance pricing may also vary based on other factors. For example, in the case of compute instances, the performance capacities of different CPUs and other components of compute servers such as memory size may come into play. FIG. 2b shows an example classification of compute instances based on instance performance ratings 251. Large instances 253 may have more computing capacity than medium instances 255, which in turn may have more computing capacity than small instances 257. Accordingly, different pricing policies 253P, 255P and 257P may be implemented for the different sizes of instances. In one embodiment, a task execution query submitted by a client may specify the sizes and/or types of instances to be acquired, and may leave the decision of where (e.g., which availability zone or zones) the instances are obtained, up to the resource manager 180. For example, a task execution request may in effect ask the resource manager "Please generate an execution plan to allocate six large instances for my task; other details of when and where the task gets executed are up to you". In some embodiments, software features such as operating systems, hypervisors, middleware stacks and the like may also be taken into account in determining the pricing policies associated with various instances. For both compute instances and storage instances, storage device characteristics such as total storage capacity, supported I/O rates and the like may be used to develop pricing policies in some implementations. Pricing policies may also be determined by networking capabilities and networking usage (e.g., number of megabytes of data transferred, and/or the distances over which network traffic is transmitted). Other classification dimensions and techniques, including extensions of the basic hierarchies shown in FIGS. 2a and 2b, may be implemented in other embodiments. The various pricing policies, including static and dynamic components of pricing, as well as location-dependent and location-independent components, may be taken into consideration by the resource manager 180 when developing execution plans in response to task execution queries in some embodiments, as described below in further detail. Some or all of the pricing information may be stored in and retrieved from resource management database 191.

Information Sources Used for Execution Plan Generation

Figure 3:
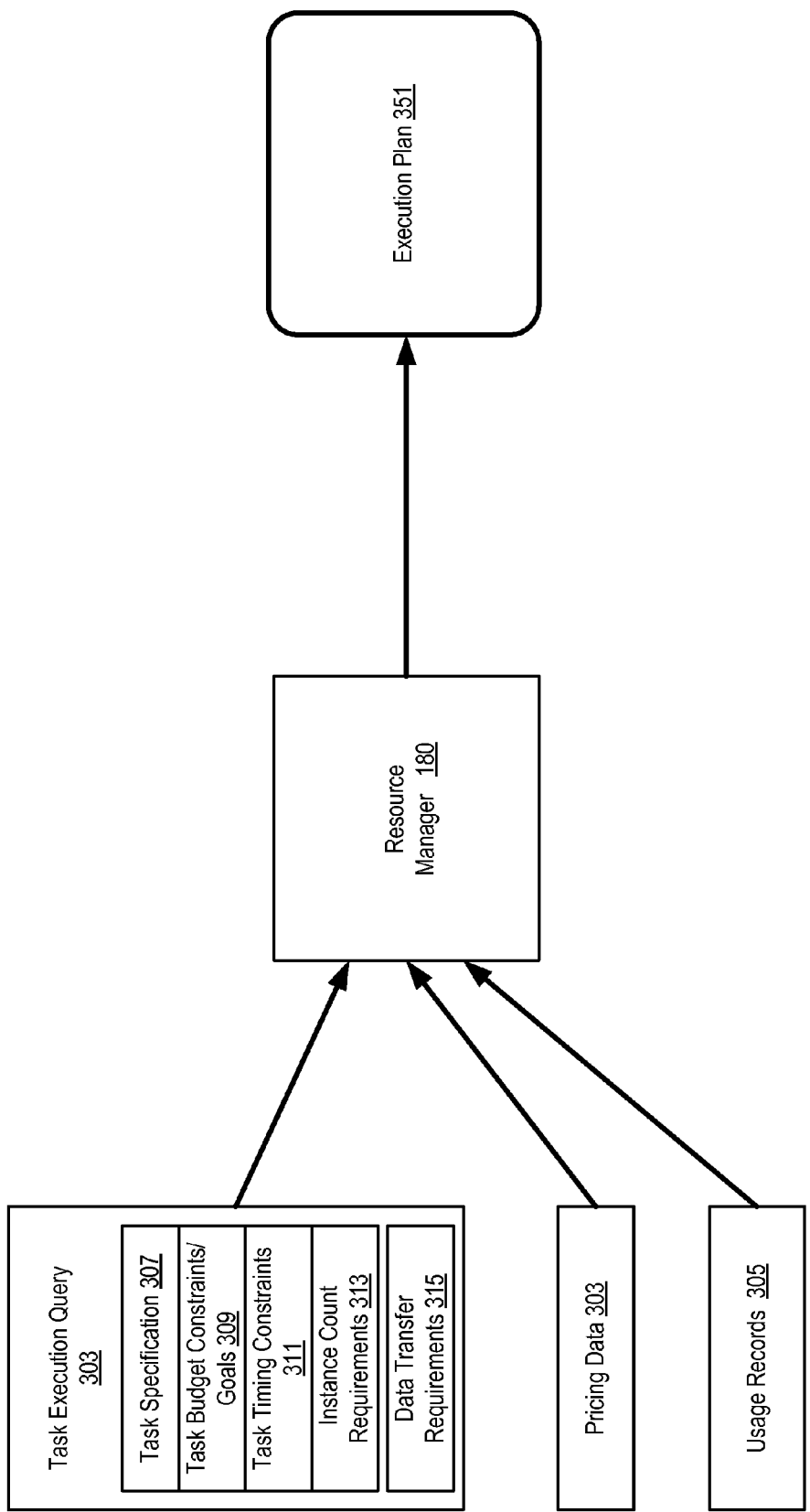
FIG. 3 illustrates an example of a set of sources from which data may be gathered by a resource manager to generate task execution plans, according to one embodiment.

FIG. 3 illustrates an example of a set of sources from which data may be gathered by resource manager 180 to generate task execution plans, according to one embodiment. As shown, the resource manager 180 may obtain task specifications 307, task budget goals (which may be expressed simply by indicating that the plan for the lowest feasible estimated cost should be generated) or constraints 309 (such as specified budget targets), and/or task timing constraints such as deadlines 311, from the task execution query 303 submitted by a client 148. In some embodiments clients may specify instance count requirements 313 (e.g., a requirement that N instances of a particular type be allocated), and/or data transfer requirements 315 (e.g., indicating an amount of data to be transferred, or a specific data set to be transferred, from a specified source to a specified destination). The task specification 307 may indicate various details of the task—e.g., whether the task is a compute task or a data transfer task, what programs or executables are to be used for the task, how the success of the task is to be determined, performance-related requirements (such as minimum CPU power, memory size, network bandwidth), and so on. In embodiments where the client 148 is allowed to specify subtasks, the same kinds of information may be specified for each subtask. Budget constraints and timing constraints may also be specified at the subtask level as well as, or instead of, at the task level in some embodiments. Budget constraints 309 may include for example the total price the client is willing to pay for task or subtask completion, or the maximum usage-based billing rate the client is willing to pay. Timing constraints 311 may indicate the deadline by which the task or subtask is to be completed. In some embodiments specific budget constraints and/or timing constraints may be omitted, allowing the resource manager 180 even greater flexibility in planning and scheduling tasks and subtasks.

The pricing data 303 used by the resource manager 180 may include the current pricing in effect for the various types of resources (such as on-demand or spot instances) at various locations of the provider network, as well as past variations in such prices over time. In some embodiments, the resource manager 180 may develop a predictive model that projects pricing changes in the future, based on pricing variations in the past. Especially for long-lasting tasks and subtasks, the projections of future pricing based on past trends may be extremely useful in determining the execution plans for the client's query. Resource usage records 305 for the requesting client 148, as well as overall resource utilization data for the various types of instances supported, may also be helpful in deciding where the client's tasks should be run and when. The resource manager 180 may be able to identify similarities between a client's previously-executed tasks and the current task specification 307 in some embodiments, allowing the resource manager 180 to make more informed choices. For example, in one scenario a task T1 may have been executed earlier on behalf of a given client using a resource instance R1 at an availability zone AZ1, and the initial estimates for the time it took to complete T1 were eventually found to be incorrect by 10%. If a new task execution query 303 for a task T2 is received from the same client, such that the task specification 307 for T2 is very similar to the task specification received earlier for T1, the resource manager 180 may be in a position to make a better estimate for how long it might take to complete T2, using records for the resources used by T1. In addition, the resource manager 180 may also decide to use similar resources at the same availability zone AZ1 that was used before, for example because the usage history data indicates that the similar task T1 completed successfully without any functional errors. More general resource usage data (i.e., data not specific to the requesting client) may also be useful in deciding the specific location and type of resources to be used for the current request—for example, the resource manager may schedule the new tasks at a more lightly-utilized availability zone than one that is extremely busy. Projections for future resource utilizations may also be made based on past usage data, and may in some implementations be tied to projections of future pricing. Pricing data 303 and/or usage records 305 may be maintained in a repository such as resource management database 191 in some embodiments. In some implementations the resource manager 180 may obtain current resource usage data from various monitoring agents distributed in the provider network, instead of or in addition to obtaining historical usage data from a repository.

Taking some or all of these data into account, together with the contents of the query 303, the resource manager 180 may generate at least one task execution plan 351 that meets the client's constraints. The task execution plan may include such details as when and where various subtasks are to be initiated, the current estimate of when they are expected to be completed, the estimated costs, and so on. In some embodiments task execution plans 303 may be stored in a persistent store such as the resource management database 191 as well, e.g., as an XML file or in some other appropriate format. In some embodiments a client 148 may be billed a specified amount for the generation of a task execution plan, e.g., based on the complexity of the task specification 307, while in other embodiments an execution plan may be generated without an associated billing amount. In one embodiment, if the resource manager is unable to generate even one execution plan 351 that meets the constraints specified by the client, the resource manager 180 may suggest alterations to the constraints that may lead to feasible execution plans. For example, the resource manager 180 may indicate to the client that while the specified task cannot be completed within the requested thirty days for the requested price, it may be feasible to complete the task within forty days for the requested price. After an execution plan 351 is accepted, it may be put into effect by the resource manager 180 in accordance with a schedule included in the plan.

Example Elements of Task Execution Queries

Figure 4:
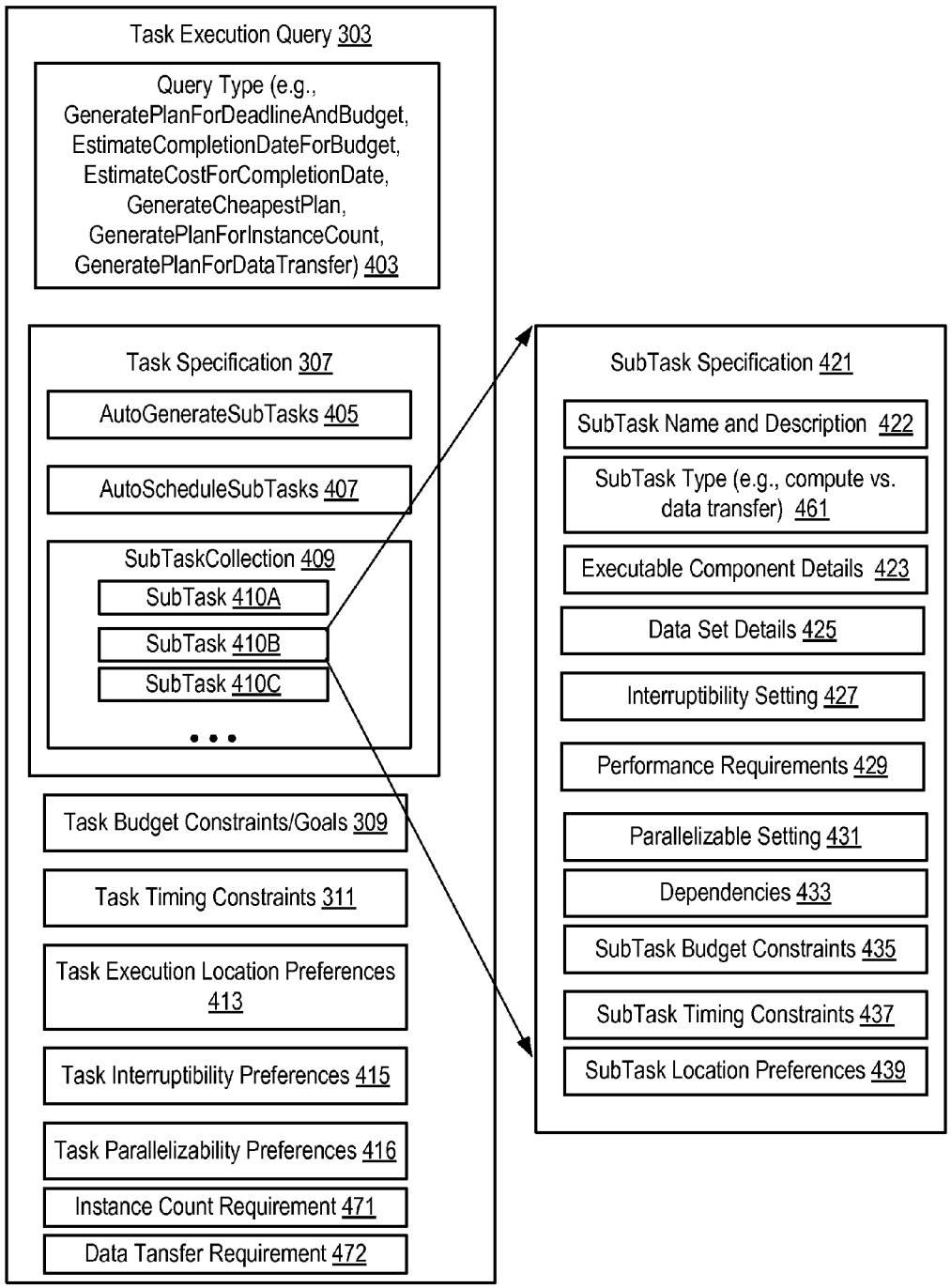
FIG. 4 illustrates example constituent elements of a task execution query, according to at least some embodiments.

FIG. 4 illustrates example constituent elements of a task execution query 303, according to at least some embodiments. As shown, the query may include an indication of a query type 403. Six example query types are shown. As suggested by its name, a GeneratePlanForDeadlineAndBudget query may indicate that the client is going to specify both a deadline and a budget limit for the task, and the resource manager 180 is to generate a plan in accordance with both the deadline and the budget limit. If the client 148 wants to obtain an estimate of how long it might take to complete a specified task under a given budget limit, the EstimateCompletionDateForBudget query type may be used. If the client wants to obtain an estimated quote for what it might cost to complete a specified task within a specified time, the EstimateCostForCompletionDate query type may be used. If the client simply wants the cheapest feasible plan, without any specific deadline or budget target, the GenerateCheapestPlan query type may be used. If the client wants to ensure that a specified number of resource instances are obtained for the task, the GeneratePlanForInstanceCount query type may be used in some embodiments. In one embodiment, the GeneratePlanForDataTransfer query type may be used, if the client simply wants a plan to transfer a specified data set, without specific budget targets or deadlines.

Task specification 307 may in some embodiments include an AutoGenerateSubTasks option 405 and/or an AutoScheduleSubTasks option 407. If the client 148 opts in for the AutoGenerateSubTasks option, this may serve as an indication that the resource manager 180 is responsible for partitioning the task into subtasks if such a partition is possible. If the client selects the AutoScheduleSubTasks option, the resource manager may be authorized thereby to schedule subtasks as appropriate, e.g., without requiring further approval from the client to initiate each subtask. In cases where the client wishes to execute the entire task without partitioning it, both of these options may be set to "false" by the client. In some cases if a client 148 selects (or sets to "true") the AutoGenerateSubTasks option, the AutoScheduleSubTasks option may also be set to "true" automatically; in other cases the two options may be set completely independently of each other.

Clients that wish to specify subtask-level details may do so in the form of a subtask collection 409. As shown, a subtask collection 409 may include one or more separate subtask specifications 421. Budget constraints 309 at the task level, such as the total amount the client is willing to pay for the task, may be included in the execution query, e.g., if the query is an EstimateCompletionDateForBudget query or a GeneratePlanForDeadlineAndBudget query. Similarly task-level timing constraints 311, such as an overall deadline for the entire task, may be included either e.g., if the query is an EstimateCostForCompletionDate query or a GeneratePlanForDeadlineAndBudget query. In some embodiments preferences for task execution locations 413, such as desired regions 112 or availability zones 120 may be indicated in the task execution query. Interruptibility preferences 415 (e.g., the logical equivalent of "Do not interrupt this task" or "Interrupt and restart my task as needed") may also be included in some implementations. The client's preference or suggestion for parallelizing the task 416 may also be specified in the task execution query in some implementations. Instance count requirements 471 and/or data transfer requirements 472 may be specified in some implementations, e.g., for GeneratePlanForInstanceCount queries and GeneratePlanForDataTransfer queries respectively.

Those clients that wish to define subtasks and their associated properties may do so via subtask specifications 421 as noted above. For clients that do not wish to partition their task into subtasks, a single subtask specification may still be usable to provide details for the entire task in some implementations. For each subtask, the provided details may include a subtask name and description 422 and a subtask type (such as compute or data transfer) 461. Details of the program executable to be used for the subtask may be provided in element 423. Data set details, e.g., the input and output locations for the data used or transferred by the application may be indicated in element 425. An interruptibility setting 427 at the subtask level may be included via element 429. Performance requirements 429 for the task, such as a minimum CPU requirement, memory size requirement, I/O transfer rate requirement, network bandwidth requirement and the like, may be included in the subtask specification as shown. Whether the subtask can be executed in parallel with other subtasks may be indicated via element 431, and any dependencies of the subtask on other subtasks may be indicated via element 433—e.g., a particular subtask S4 may only be schedulable if subtasks S1 and S2 have completed successfully, or a subtask S5 may depend on a website with URL URL1 being up. Budget constraints, timing constraints and location preferences may be specified at the subtask level using elements 435, 437 and 439 in some embodiments. Not all the fields for tasks or subtasks may be populated in a given task execution query 303, and some fields may be populated with default values if a specific value is not specified by the client 148. Various fields shown only at the subtask level (e.g., executable component details 423) in FIG. 4 may be implemented at the task level as well in some implementations.

Example Elements of Task Execution Plans

Figure 5:
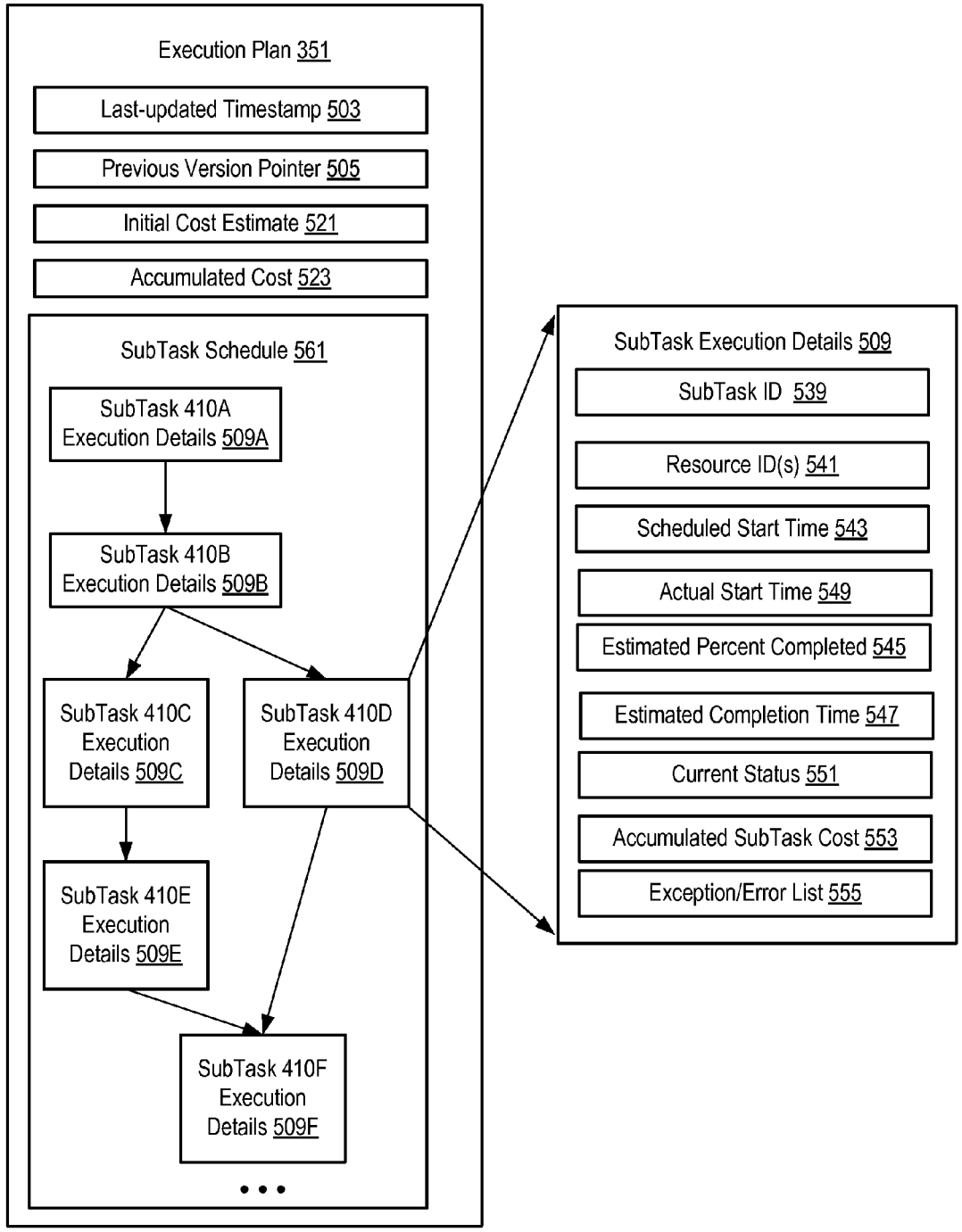
FIG. 5 illustrates example constituent elements of a task execution plan, according to at least some embodiments.

FIG. 5 illustrates example constituent elements of a task execution plan 351 that may be generated in response to a task execution query 303, according to at least some embodiments. As noted earlier, task execution plans, especially for long-running tasks, may evolve over time as operational conditions change in the provider network. As shown, the plan 351 may include a last-updated timestamp field 503, indicating when the plan was last updated. In some implementations where multiple versions of execution plans are maintained, a pointer 505 to a previous version may also be included in the plan. The initial cost estimate for completing the entire task may be included in element 521, and the current or most recent measurement of accumulated actual cost may be included in element 523. Comparisons of the initial estimated cost to the actual costs incurred thus far during execution may be very helpful in modifying the plan to meet the client's budget constraints.

In the illustrated embodiment, the task execution plan 351 may include a subtask schedule 561 with a collection of execution details 509 for each of a plurality of subtasks 410. In the example shown, respective execution plans for six subtasks 410A-410F are illustrated in a directed graph format, in which the directions of the edges indicate the sequence in which the subtasks are expected to be implemented. For example, subtask 410B is to be executed after subtask 410A, while either subtask 410C or subtask 410D (or both) can be scheduled after subtask 410B.

A subtask execution details element 509 may include an identifier 539 of the subtask, an identifier or identifiers 541 of the resource instance(s) to be used for the subtask, and a scheduled start time 543 for the subtask. An element 549 may indicate the actual start time for subtasks that have already begun. An estimates of the fraction of the subtask that has been completed thus far may be included as element 545, and element 547 may include the current estimated completion time of the task. The current status of the task (e.g., whether it is running, waiting to be scheduled, or failed) may be indicated by element 551. In some embodiments the current accumulated subtask cost may be indicated via element 553. In some implementations, an indicator of any exceptions or errors encountered during the subtask's execution may be available via an element 555. The various elements that contain metrics or data pertaining to actual execution (e.g., elements 523, 549, or 553) may be set to zero or null values until the corresponding task or subtask begins execution. The rates or intervals at which the metrics are updated may be configurable via parameters specified by the client in some embodiments.

Interactions Between Resource Managers and Clients

Figure 6:
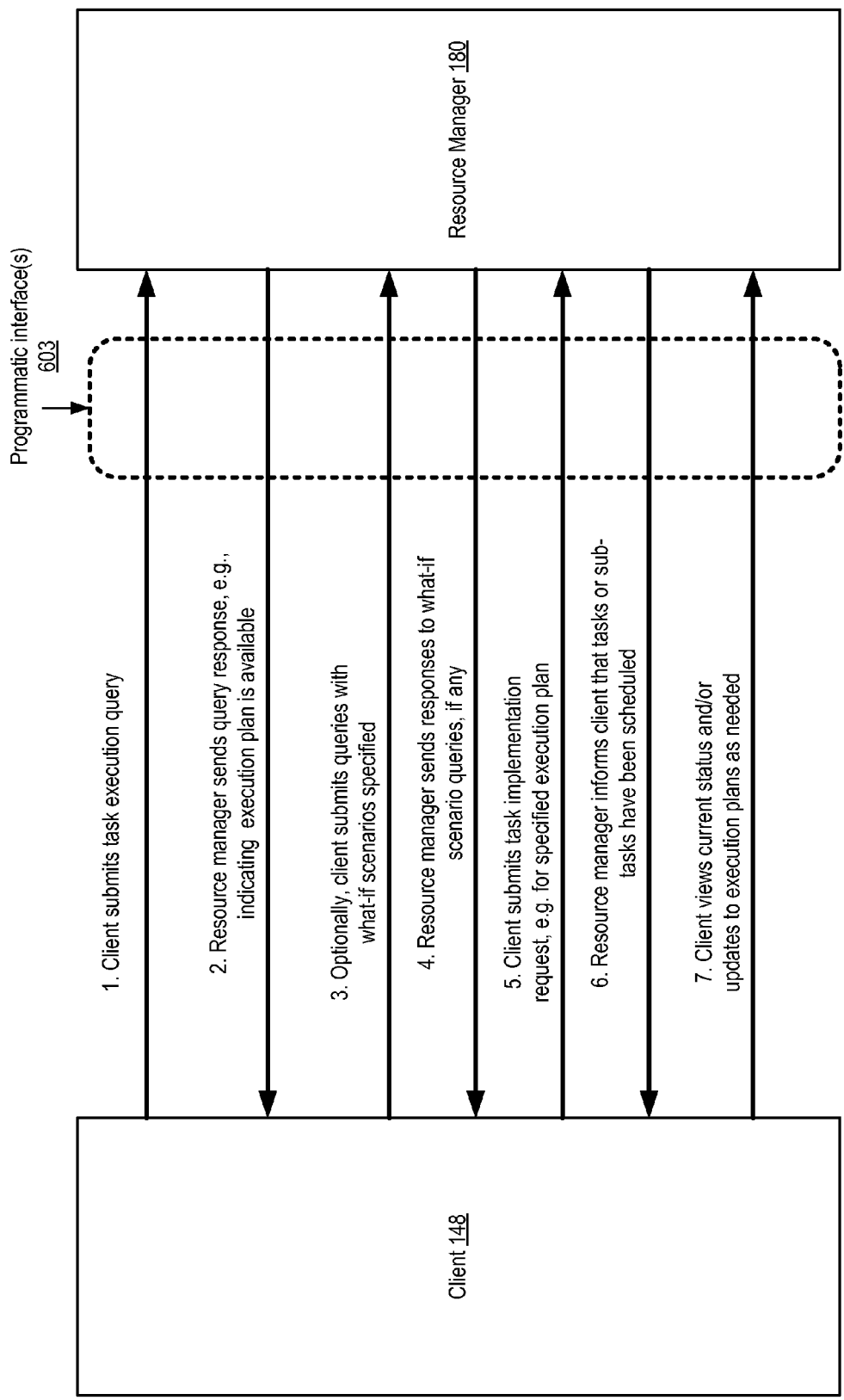
FIG. 6 illustrates example interactions between a client and a resource manager configured to generate execution plans in response to task execution queries, according to at least some embodiments.

FIG. 6 illustrates example interactions between a client 148 and a resource manager 180 configured to generate execution plans 351 in response to task execution queries 303, according to at least some embodiments. As shown by the arrow labeled "1", the client 148 may submit a task execution query 303, e.g., via a programmatic interface implemented 603 by the interface manager 183 or the resource manager 180. The programmatic interface may comprise one or more graphical user interfaces (GUIs), web pages or web sites, APIs, command-line interfaces, or any desired combination of such interfaces in various embodiments. Using the various data sources discussed above in conjunction with the description of FIG. 3, the resource manager 180 may generate a task execution plan. The resource manager 180 may then provide a response to the client's query 303, as indicated by the arrow labeled "2" in FIG. 6. The response, which may also be formatted in accordance with interface 603 in some embodiments, may indicate to the client that an execution plan for the task has been found.

In some embodiments, as indicated by the arrow labeled "3" in FIG. 6, the client 148 may optionally modify the original query 303, or submit additional queries, specifying various what-if scenarios such as a different deadline or a different budget limit. If such modified or new queries are submitted, the resource manager 180 may perform the needed computations (such as the generation of new plans or modified plans 351) and respond to the client 148, as indicated by the arrow labeled "4". The client 148 may then submit a task implementation request (as indicated by the arrow labeled "5"), e.g., indicating an approved execution plan for the resource manager 180 to implement.

In response to the implementation request, the resource manager 180 may schedule the execution of a task or subtask in accordance with an approved plan 351, and inform the client 148 of the scheduled execution(s), as indicated by the arrow labeled "6". Subsequently, in some implementations, the client 148 may use portions of the same interface 603 to submit status queries for its tasks and/or subtasks, as indicated by the arrow labeled "7". In some embodiments in which the resource manager is allowed to modify the task execution plan 351, the client 148 may also be able to view the updates to the execution plans, or one or more versions of the execution plan, via the programmatic interface 603. In some embodiments different interfaces may be usable for the various interactions illustrated in FIG. 3—e.g., a client may specify a task execution query via a web interface and later view task status via an API or command-line interface.

Example Web-Based Interfaces

FIG. 7 illustrates a portion of an example web-based interface that may be implemented to allow clients to submit task execution queries, according to some embodiments. As shown, the interface may comprise a web page 700 including a number of different regions. The web page 700 may include a message area 703. Various task-level details may be specified using respective fields in the illustrated embodiment. In some embodiments the interface shown may be usable not just for an initial task execution query, but also to submit additional queries later on the lifetime of the task, e.g., if the client wished to change some preferences or constraints. A task identifier may be specified via field 705 for previously-created tasks in such embodiments. For a first-time query on a given task, field 705 may be left blank, as indicated by the message shown for field 705, and the resource manager 180 may assign or generate a task identifier. Field 707 may be usable to indicate a description for the task. The type of the task, e.g., whether it is a compute task, a data-transfer task, or a combination, may be specified via field 709. The executable program or programs to be used may be indicated via field 711. Deadline and/or budget constraints or goals may be specified via fields 713 and 715 respectively. In some embodiments the client may simply indicate a general budget goal (e.g., to obtain the cheapest feasible execution plan) without specifying specific numerical budget constraints.

A number of different types of task-level preferences may be indicated using some of the remaining fields of web page 700. A preferred availability zone may be indicated via field 717. If the client has preferences about the type of instance to be used, such as on-demand vs. spot vs. reserved instances, such a preference may be indicated using field 719. Interruptibility preferences (such as whether the task can be paused and resumed without excessive overhead) may be specified via field 721. The default setting shown for field 721 ("interruptible and idempotent") indicates that the task can be paused and restarted, and also that the task can be run multiple times without erroneous results. Performance-related preferences such as a required or preferred instance size (small vs. medium vs. large, for example) or instance count may be specified via field 723. If the client 148 is willing to let the resource manager 180 attempt to partition the task into smaller subtasks (as described in the discussion of field 405 of FIG. 4 above), an affirmative response may be selected for the auto-generate subtasks field 725. Similarly, if the client is willing to let the resource manager 180 schedule subtasks without additional approval by the client, an affirmative response may be selected for the auto-schedule subtasks field 727. Clients wishing to specify details for individual subtasks may be allowed to do so using button 729. Clicking on next button 731 may take the client 148 to additional web pages of the interface, which may for example be used to provide additional details of the task, such as a source, destination and data set size in the case of a data transfer task.

FIG. 8 illustrates a portion of an example web-based interface that may be implemented to allow clients 148 to submit subtask preferences, according to some embodiments. The illustrated web page 800 may be displayed, for example, when a client 148 clicks on the subtask detail button 729 of web page 700 in FIG. 7. For each subtask for which the client 148 wished to provide details, a corresponding form submission page 800 may be shown, and a new subtask number or identifier (similar to the subtask identifier 0001 shown in message area 803) may be generated by the resource manager 180. A name and description of a subtask may be provided using fields 805 and 807 respectively. The remaining fields of the example subtask specification form shown may allow the client 148 to supply similar types of constraints and preferences at the subtask level as were specified at the task level using the fields shown in FIG. 7. For example, the type of task (compute vs. data transfer) may be indicated via field 809, the executable program to be run may be indicated via field 811, and performance-related requirements such as instance size, CPU speed or memory size may be indicated via field 815, Location preferences may be specified via another field such as field 817. Subtask dependencies (such as whether a given subtask can only be started after another subtask has already been completed) may be indicated via field 819. In embodiments where budget and/or timing constraints can be specified at the subtask level, fields 821 and 823 may be used to indicate such constraints. Button 829 may be used to proceed to another subtask specification, and button 831 may be used to indicate that the client 148 has finished specifying subtasks for the task being considered.

Figure 9:
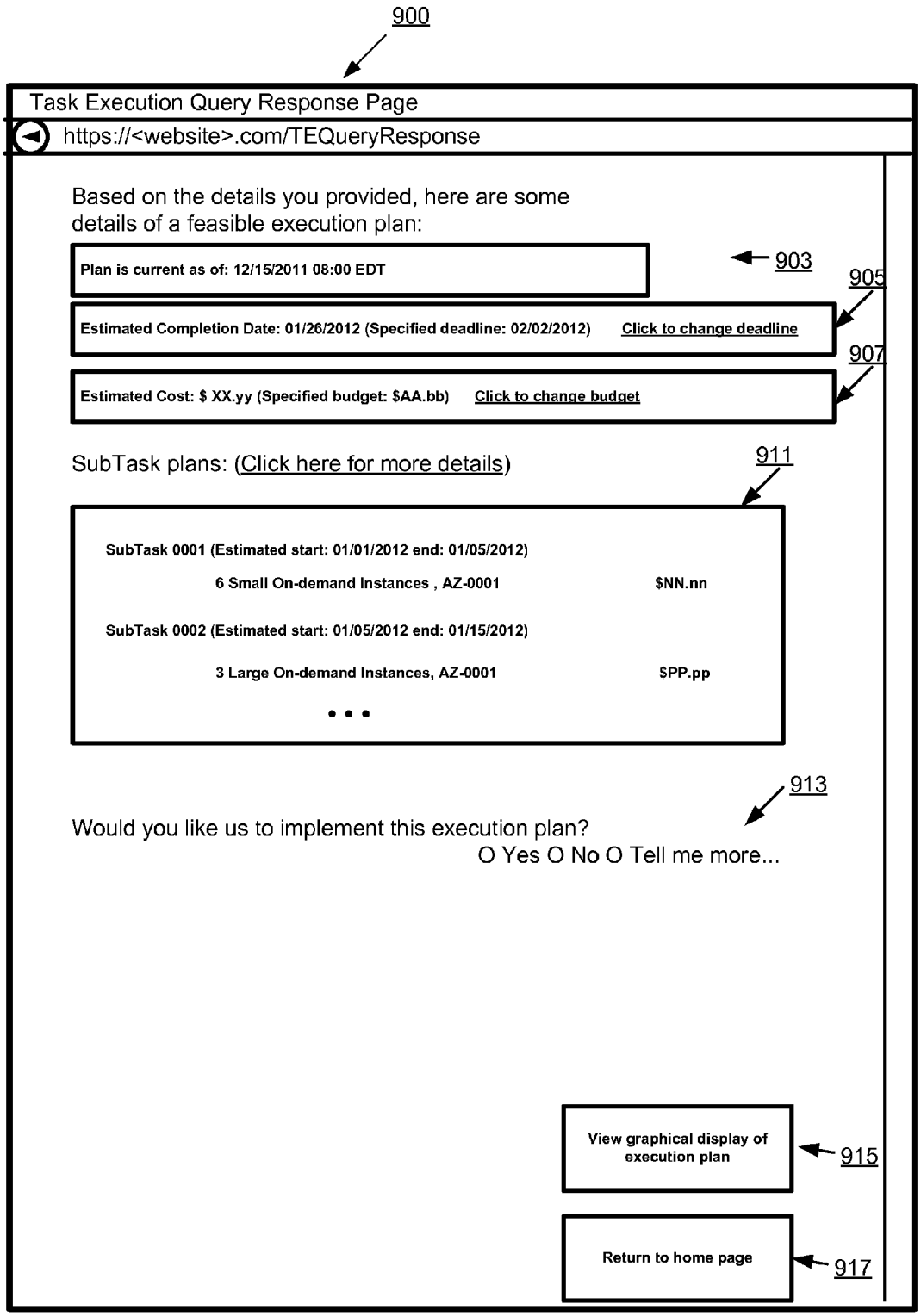
FIG. 9 illustrates a portion of an example web-based interface that may be used to display a task execution plan, according to some embodiments.

FIG. 9 illustrates a portion of an example web-based interface that may be used to display a task execution plan 351 generated by resource manager 180 in response to a task execution query, according to some embodiments. As shown, the interface may include a web page 900. The web page may include a field 903 indicating when the plan was generated or last updated. Field 905 may show an estimated completion date for the task, and may also indicate the deadline specified by the client in the corresponding task execution query. Field 907 may show an estimated cost of completing the task, and may indicate the budget constraint specified by the client. In the illustrated embodiment, the client may also be able to modify the original budget constraint and/or the original time constraint using clickable links in fields 905 and 907. Thus, in this example the client 148 may specify various alternative what-if scenarios by updating the deadline or total task budget.

Area 911 of web page 900 may provide high-level information regarding the execution plans for various subtasks of the task. (In cases where the task is not partitioned into multiple subtasks, an area similar to 911 may serve to provide details of the entire task, which may be considered as the equivalent of a single subtask.) In the illustrated example, two subtasks with respective identifiers 0001 and 0002 are shown. For each subtask, an estimated start time and end time, the sizes and locations (e.g., availability zones) of instances to be used, and the estimated cost of the subtask are shown in area 911. In some implementations, the client may be allowed to submit a task implementation request corresponding to the execution plan, e.g., by selecting the "Yes" response to the question "Would you like us to implement this execution plan?" in area 913 of web page 900. In one embodiment, a graphical illustration of the task execution plan may be accessed via button 915. Button 917 may allow the client to return to a home page of the task specification web site.

Figure 10:
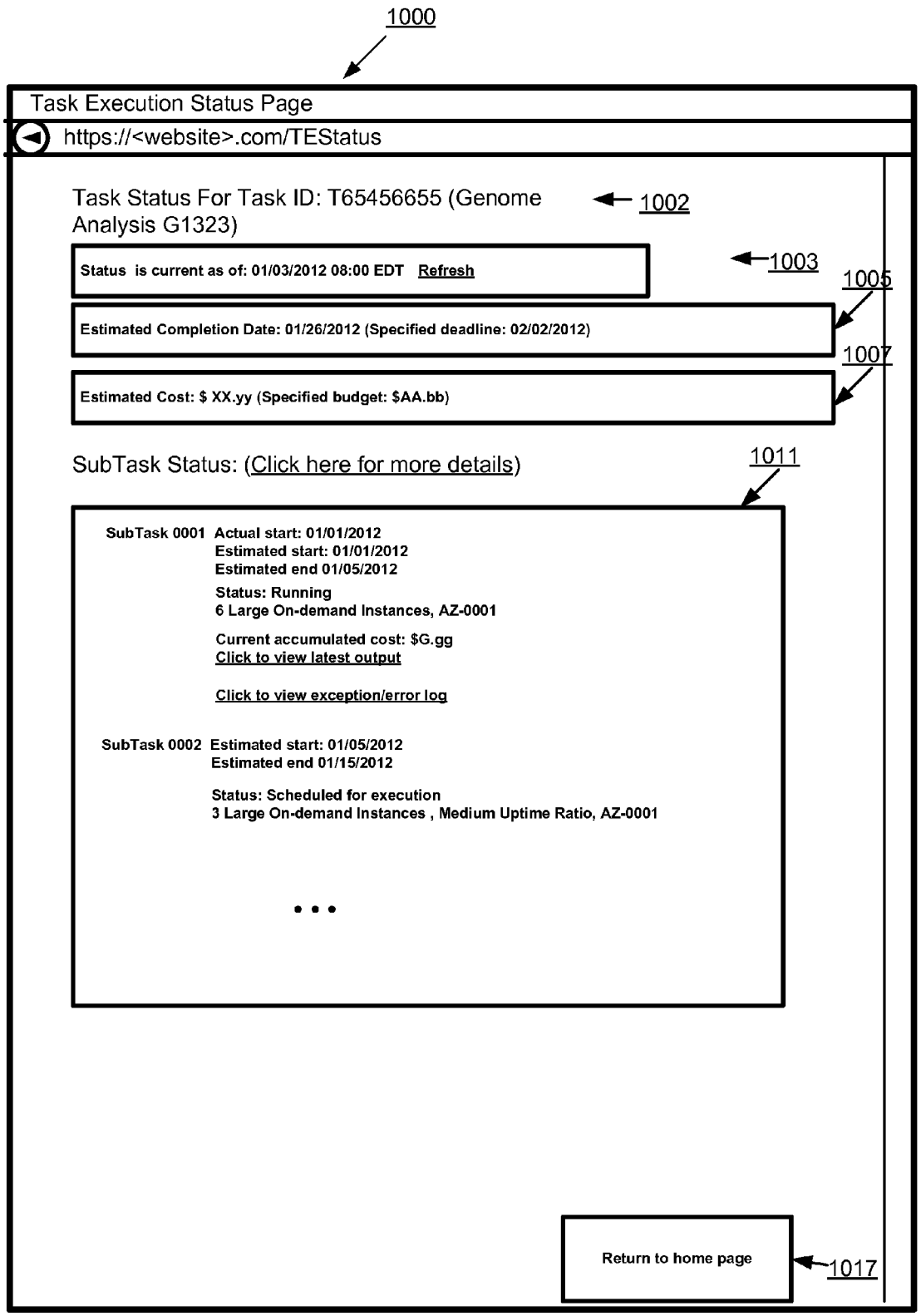
FIG. 10 illustrates a portion of an example web-based interface that may be used to display a current status of a task, according to some embodiments.

FIG. 10 illustrates a portion of an example web-based interface that may be used to display a current status of a task, according to some embodiments. As shown, the interface may include web page 1000 in which the task identifier (e.g., "T65456655" in the illustrated example) and/or task name of the task may be displayed. A timestamp field 1003 may indicate the time at which the displayed status information was obtained, and as in the illustrated example, a clickable link or other control may be provided to allow the client to refresh the status. Fields 1005 and 1007 may display the current (as of the time of the latest status refresh) estimated completion time and the current estimated cost or price of the task, respectively. The deadline and budget limits specified by the client 148 for the task may also be displayed, as also shown in fields 1005 and 1007.

In some implementations the status of individual subtasks may also be displayed via a portion of the interface. In FIG. 10, for example, area 1011 shows the current status of two subtasks 0001 and 0002. In this example, subtask 0001 is currently running while subtask 0002 is scheduled for later execution. For a running task, the actual start time and the currently estimated end time may be shown; in some implementations, the originally estimated start time may also be displayed for reference. The resources being used may also be indicated, together with their availability zone(s) or other location information. The accumulated cost of the running subtask may also be shown. In the illustrated example, clickable links are provided to allow the client 148 to view the latest output from the running subtask (e.g., the output from a command similar to "tail -f<standard output file>" on Linux-based systems), and or the latest exceptions or errors encountered by the subtask (which may be accumulated in an error or exception log). For a subtask that is currently scheduled for later execution, such as subtask 0002 in FIG. 10, the estimated start and end times may be shown, together with the resources expected to be used and the locations of the resources. Various other details may be shown in other embodiments, and some of the details illustrated in the example web page 1000 may be hidden. It is noted that although web-based interfaces have been shown in the examples of FIGS. 7, 8, 9, and 10, similar information may be displayed to (or provided by) the client 148 using other types of programmatic interfaces in some embodiments, such as other GUIs, various APIs, command-line interfaces, or a combination thereof.

Methods to Implement Resource Manager Functionality

Figure 11:
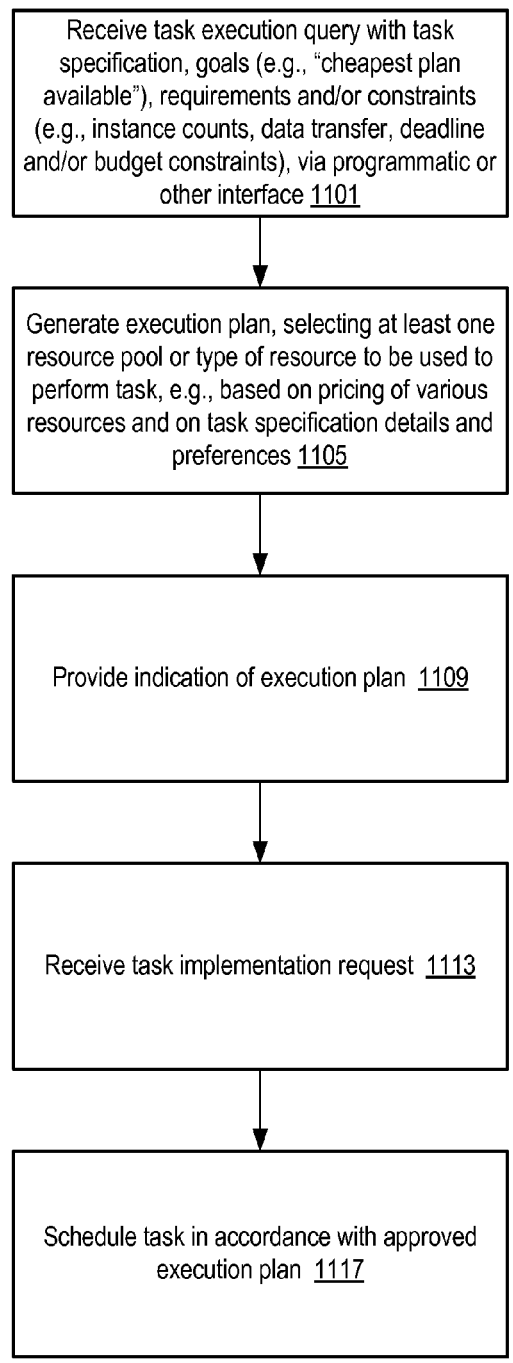
FIG. 11 is a flow diagram illustrating aspects of the functionality of a resource manager operable to support deadline-based task pricing and scheduling, according to at least some embodiments.

FIG. 11 is a flow diagram illustrating aspects of the functionality of a resource manager 180 operable to support deadline-based task pricing and scheduling, according to at least some embodiments. As shown in element 1101, a task execution query 303 with a task specification 307 may be received by the resource manager 180, e.g., via a programmatic interface such as a web page similar to that shown in FIG. 7. The task specification 307 may include details on the types of task (e.g., whether it is a compute task, a data transfer task, or a combination), the executable and/or data set for the task, subtask information where applicable, as so on, as discussed above in conjunction with the description of FIG. 4. Depending on the types of task execution queries supported, the query may also include general budget-related goals such as a request for the lowest expected cost plan, a specific pricing constraint 309 such as a budget limit, and/or a timing constraint 311 such as a deadline by which the task is to be completed. In some embodiments other types of requirements such as the number and/or types of resource instances to be allocated may be included in the request, or the data set to be transferred from a specified source to a specified destination.

In response to the task execution query 303, as indicated in element 1105 of FIG. 11, the resource manager may generate one or more task execution plans 351. A task execution plan 351 may identify at least one resource pool from which a resource of a particular type (such as an on-demand instance or a spot-instance) is to be allocated for the task. In some embodiments, resources may be managed individually instead of being organized into pools, in which case the execution plan may simply comprise a selection of the type of resource to be used, or in some cases the actual resource to be used. The pool or the resource type may be chosen based at least in part on the corresponding pricing policy associated with the pool, the task specification, and/or the constraints or preferences specified for the task. An indication of the execution plan may be provided to the requesting client 148 in some embodiments (element 1109).

The client 148 may submit a task implementation request corresponding to a task execution plan 303 in some embodiments (element 1113). In response, the resource manager 180 may schedule and/or initiate execution of a task (or a subtask in embodiments where subtasks are supported) in accordance with the execution plan (element 1117). In some implementations, a task implementation request may not be required; e.g., the resource manager may simply execute the task in response to the task execution query itself if the various constraints specified by the client can be met and if the client has agreed that no additional approval or implementation request is necessary. One or more interfaces may be implemented by the resource manager 180 to allow clients 148 to view the status of the task and/or its subtasks. In some embodiments, the resource manager 180 may modify or tune the execution plan over time, e.g., in response to changing operational conditions in the provider network 110, changing prices that may be influenced by supply and demand, and the like. For example, in one scenario the resource manager 180 may change an execution plan to use resource instances at a different location or of a different type (e.g., replace an on-demand instance in the plan with a spot instance) if that results in a lower cost to the client, or in a quicker execution of the task. Such plan refresh operations or modifications may be performed based on various criteria in different embodiments: for example, based on a schedule (e.g., plans may be reviewed and modified if necessary every week), whenever a subtask is completed, and/or in response to user requests. When the entire task is completed, the client 148 may be notified.

Figure 12:
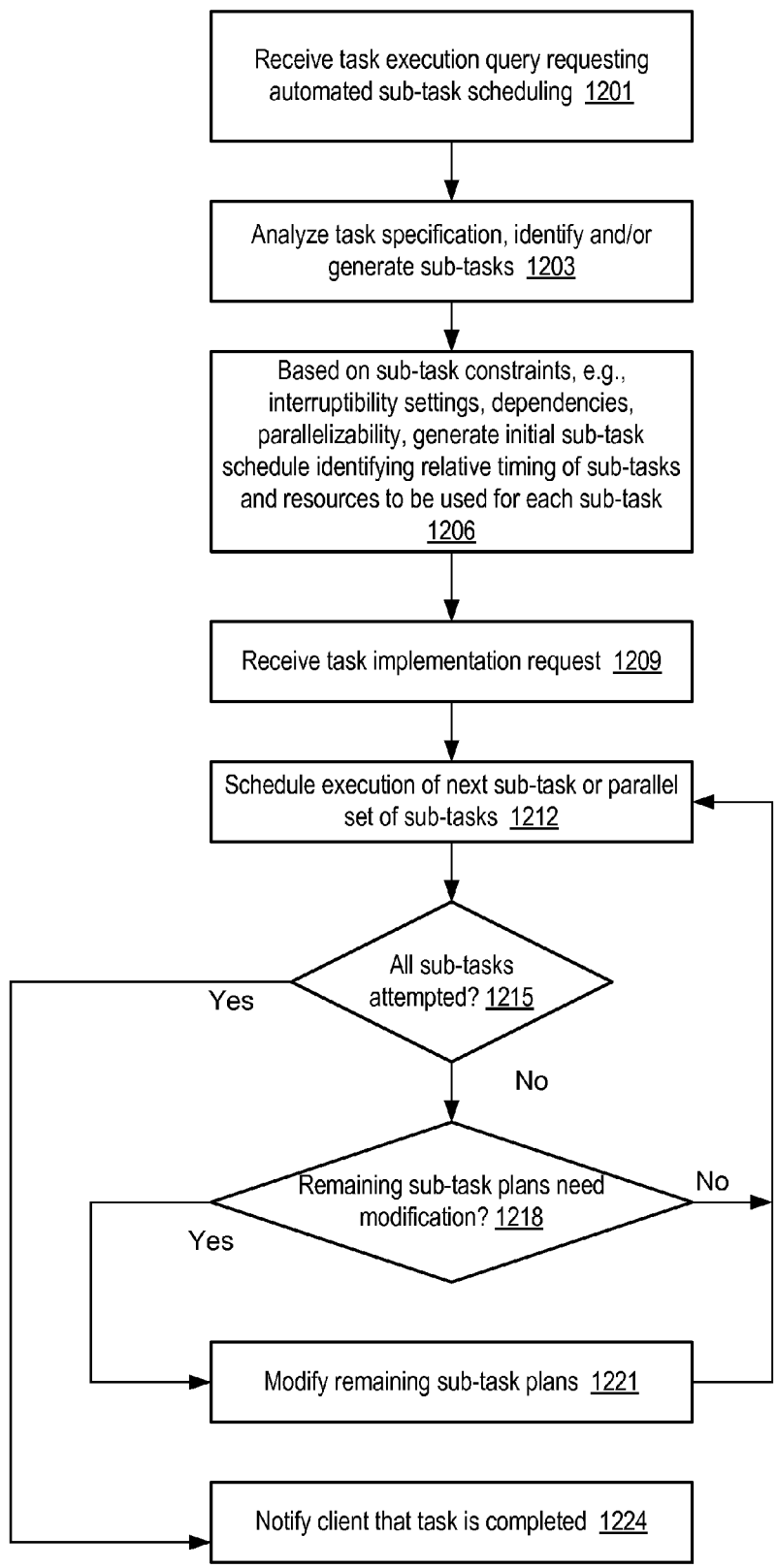
FIG. 12 is a flow diagram illustrating a subset of the functions of a resource manager configured to automate subtask scheduling, according to at least some embodiments.

FIG. 12 is a flow diagram illustrating a subset of the functions of a resource manager 180 configured to automate subtask scheduling, according to at least some embodiments.

As shown in element 1201, a task execution query requesting automated scheduling of subtasks may be received by the resource manager 180. The resource manager 180 may determine subtask boundaries (element 1203 of FIG. 12) either based on subtask specifications 421 explicitly provided by the client 148, or based on an analysis of the task specification. For example, if the task specification indicates that the task uses a standard programming design pattern such as map-reduce, the resource manager 180 may be able to partition the task into subtasks without additional input from the client 148. In some embodiments, the resource manager 180 may be able to determine subtask boundaries based on analysis of resource usage history of the client—for example, if the client previously submitted similar tasks for execution.

The resource manager 180 may then generate an initial schedule for various subtasks (element 1206), based for example on constraints and preferences provided by the client at the task level or the subtask level, and/or on subtask characteristics (such as subtask parallelizability) deduced by the resource manager 180. The initial subtask schedule may identify the types and locations of resources (e.g., on-demand instances, spot instances, or reserved instances) to be used for the sub-tasks, and the sequence in which the subtasks are to be performed (which may include phases during which multiple subtasks are run in parallel). In response to a task implementation request (as indicated in element 1209), the resource manager 180 may schedule or initiate the execution of the next subtask (which may be the first subtask of the task) or the execution of the next set of subtasks that can be executed in parallel (element 1212). If all the subtasks have been attempted or completed (as determined in element 1215), the client may be notified that the task has been completed (element 1224). If subtasks remain (as also determined in element 1215), in the illustrated embodiment the resource manager 180 may determine whether the plans for the remaining subtasks need to be modified (element 1218). If such a modification appears justified, one or more of the execution plans for the remaining subtasks may be modified (element 1221). The resource manager 180 may then schedule the next subtask or set of parallel subtasks based on the updated plans. If no modification were deemed necessary to the plans for remaining subtasks, the resource manager may use the existing version of the plans for scheduling the remaining subtasks. The pattern of completing a subtask, then checking whether plans for remaining subtasks need modification and making such modifications if needed, may be continued until all subtasks have been attempted and the client is notified that the task is complete.

Subtask execution plans may be modified based on a number of different factors in different embodiments. For example, the resource manager 180 may discover that a particular subtask S1 of task T1 took longer than expected to complete, so a subsequent subtask S2 of task T1 may need to be rescheduled at a more powerful compute instance to ensure that the overall task deadline can be met. In another example, a particular subtask S3 of task T1 may have been completed more quickly than expected, so it may be possible to schedule a subsequent subtask S4 at a slower or less powerful server than originally planned, thereby potentially reducing the client's billing charges. Various other factors may contribute to subtask plan re-computations, which may be performed not just when a subtask is completed, but at other times, e.g., based on a plan refresh schedule being implemented by the resource manager 180, or in response to refresh requests from clients 148. It is noted that in some embodiments not all the operations illustrated in FIGS. 11 and 12 may be performed in the order shown, and some of the illustrated operations may be omitted—for example, subtask plan modifications may not be supported in some implementations.

Example Use Cases

The techniques described above for deadline-based pricing and scheduling of network-accessible resources may be useful in a wide variety of environments. As the size and complexity of cloud-based resource provisioning grows, and more and more applications are deployed into cloud environments, the probability that resources of a particular type or in a particular data center remain underutilized at least temporarily may grow. Resource managers that can utilize that unused capacity to tasks or subtasks that can be paused and resumed, will help provider network operators to maximize their return on investment, while also increasing the customer base of the provider network.

The functionality described above may be particularly useful to certain classes of clients, such a s academic researchers, that have potentially long-duration computing tasks, but also low computing budgets. Such researches may be willing to wait for their tasks to be completed using spare resource capacity, as long as their budget limits are not compromised and as long as their typically long term overall task deadlines can be met. Such researchers may also be more willing to either partition their tasks themselves into manageable subtasks that are idempotent and/or interruptible, or to follow industry standard programming paradigms that allow resource managers to analyze task specifications to partition and schedule subtasks. The deadline-based computing approaches described herein may also be suitable for big data applications such as social media data analysis, sensor data analysis, bioinformatics applications and the like.

Illustrative Computing Device

Figure 13:
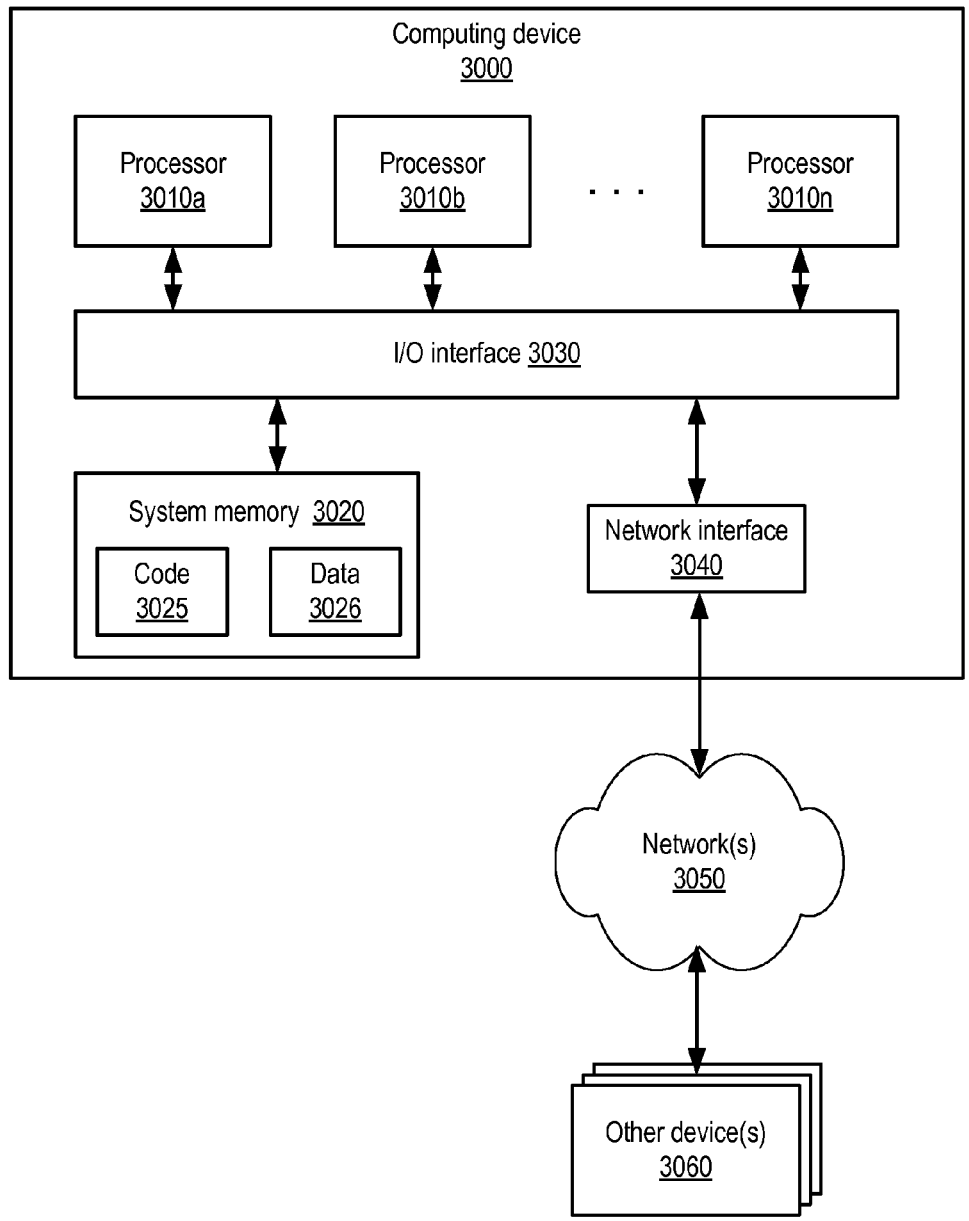
FIG. 13 is a block diagram illustrating an example computing device that may be used in some embodiments.

In at least some embodiments, a server that implements a portion or all of one or more of the technologies described herein, including the techniques to implement the functionality of resource manager 180 and the interface manager 183, may include a computing device such as a general-purpose computer system that includes or is configured to access one or more computer-accessible media. FIG. 13 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIGS. 1 through 12, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIGS. 1 through 12 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a plurality of computing devices configured to implement a plurality of resources of a provider network, wherein the resources are organized into a plurality of resource pools, wherein each resource pool of the plurality of resource pools has an associated pricing policy and an associated resource usage interruptibility policy, and wherein at least one resource pool of the plurality of resource pools has a different resource usage interruptibility policy than another one of the plurality of resource pools; and
one or more computing devices configured to implement a resource manager;
wherein the resource manager is configured to:
receive a task execution query comprising a specification of a task to be performed for a client using one or more resources of the plurality of resources, wherein the specification has an associated target deadline for completion of the task and an associated budget constraint for completion of the task;
determine an interruptibility characteristic of at least a portion of the task, wherein the interruptibility characteristic describes a suitability of the at least a portion of the task for being interrupted;
in response to receiving the task execution query and determining the interruptibility characteristic of the at least a portion of the task, generate an execution plan for the task, wherein the execution plan comprises using a resource of a selected resource pool to perform the at least a portion of the task, wherein the resource pool is selected from among the plurality of resource pools based at least in part on the associated pricing policy of the resource pool, the associated resource usage interruptibility policy of the resource pool, and the interruptibility characteristic of the at least a portion of the task;
provide an indication of the execution plan to the client; and in response to a task implementation request from the client, schedule the at least a portion of the task using a particular resource from the selected resource pool.

2. The system as recited in claim 1, wherein the resource manager is further configured to:
    determine the interruptibility characteristic of the at least a portion of the task based at least in part on one of: an analysis of the task specification, an interruptibility setting indicated in the task execution query, or an analysis of a resource usage history record of the client.

3. The system as recited in claim 1, wherein the execution plan comprises a plurality of sub-tasks including a first sub-task and a second sub-task, wherein the resource manager is further configured to:
    determine that the first sub-task and the second sub-task are to be performed in parallel based at least in part on one of: a parallelizability setting indicated in the task execution query, or a parallelizability analysis of the task specification.

4. The system as recited in claim 1, further comprising an interface manager configured to:
    implement a programmatic interface allowing the client to submit the task execution query,
    wherein the task execution query is received via the programmatic interface.

5. The system as recited in claim 1, wherein the resource manager is further configured to:
    determine a performance rating of the resource on which to schedule the at least a portion of the task, based at least in part on one of: a resource performance setting indicated in the task execution query, or a requirements analysis of the task specification.

6. A method, comprising:
    receiving a task execution query comprising a specification of a task to be performed for a client using one or more resources of a plurality of resources, wherein the specification has an associated target deadline for completion of the task, and wherein each resource of the plurality of resources has an associated pricing policy and an associated resource usage interruptibility policy, wherein at least one of the plurality of resources has a different resource usage interruptibility policy than another one of the plurality of resources;
    determining an interruptibility characteristic of at least a portion of the task, wherein the interruptibility characteristic describes a suitability of the at least a portion of the task for being interrupted;
    in response to receiving the task execution query and determining the interruptibility characteristic of the at least a portion of the task, generating an execution plan for the task, wherein the execution plan comprises using a resource of the plurality of resources to perform the at least a portion of the task, and wherein the resource is selected from the plurality of resources based at least in part on the associated pricing policy of the resource, the resource usage interruptibility policy of the resource, the associated target deadline, and the interruptibility characteristic of the at least a portion of the task; and
    in response to a task implementation request from the client, scheduling the at least a portion of the task in accordance with the execution plan.

7. The method as recited in claim 6, further comprising:
    determining the interruptibility characteristic of the at least a portion of the task based at least in part on at least one of: an analysis of the task specification, an interruptibility setting indicated in the task execution query, or an analysis of a resource usage history record of the client.

8. The method as recited in claim 6, wherein the execution plan comprises plans for a plurality of sub-tasks including a first sub-task and a second sub-task, further comprising:
    determining that the first sub-task and the second sub-task are to be performed in parallel based at least in part on one of: a parallelizability setting indicated in the task execution query, or a parallelizability analysis of the task specification.

9. The method as recited in claim 6, further comprising:
    implementing a programmatic interface allowing the client to submit the task execution query,
    wherein the task execution query is received via the programmatic interface.

10. The method as recited in claim 6, wherein the specification comprises an indication that the task comprises one or more compute sub-tasks, wherein each sub-task of the one or more compute sub-tasks comprises an execution on a computing device of an executable component specified for the compute sub-task.

11. The method as recited in claim 6, wherein the specification comprises an indication that the task comprises one or more data transfer operations, wherein each operation of the one or more data transfer operations comprises a transfer of a specified data set from a source to a destination, wherein at least one of the source and destination of a particular data transfer operation of the one or more data transfer operations comprises the resource.

12. The method as recited in claim 11, wherein said scheduling the at least a portion of the task comprises one of: (a) an initiation of a network transfer of the specified data set, using a network path sharable by two or more clients, at a time determined at least in part on the associated target deadline (b) an initiation of a network transfer of the specified data set, using a private network connection established between a client network of the client and a data center comprising the resource or (c) a transfer of a copy of the specified data set to the resource from a physical storage device transported from a client premise of the client to a data center comprising the resource.

13. The method as recited in claim 6, wherein the specification has an associated budget constraint of the client, and wherein the execution plan is based at least in part on the associated budget constraint.

14. The method as recited in claim 6, further comprising:
    receiving a second task execution query comprising a second specification of a second task to be performed for a client using one or more resources of the plurality of resources, wherein the second specification has an associated budget constraint for completion of the second task, and wherein the second task execution query comprises a request for a target time for completion of the second task in accordance with the associated budget constraint; and
    in response to receiving the second task execution query, generating an estimated target completion time for the second task, based at least in part on pricing policies of one or more resources of the plurality of resources and an analysis of the second specification.

15. The method as recited in claim 6, wherein the execution plan comprises plans for a plurality of sub-tasks, wherein a particular sub-task of the plurality of sub-tasks comprises the at least a portion of the task, further comprising:
implementing a programmatic interface allowing the client to obtain a current status of each sub-task of the plurality of sub-tasks.

16. The method as recited in claim 15, wherein the programmatic interface allows the client to obtain an indication of whether an exception is encountered during the particular sub-task.

17. A non-transitory computer-accessible storage medium storing program instructions that when executed on one or more processors:
receive a task execution query comprising a specification of a task to be performed for a client using one or more resources of a plurality of resources, wherein the specification has an associated target deadline for completion of the task, and wherein each resource of the plurality of resources has an associated pricing policy and an associated resource usage interruptibility policy, wherein at least one of the resources of the plurality of resources has a different resource usage interruptibility policy than another one of the plurality of resources;
determine an interruptibility characteristic of at least a portion of the task, wherein the interruptibility characteristic describes a suitability of the at least a portion of the task for being interrupted;
in response to receiving the task execution query and determining the interruptibility characteristic of the at least a portion of the task, generate an execution plan for the task, wherein the execution plan comprises using a resource of the plurality of resources to perform the at least a portion of the task, wherein the resource is selected from the plurality of resources based at least in part on the associated target deadline, the associated resource usage interruptibility policy of the resource, and the interruptibility characteristic of the at least a portion of the task; and
in response to a task implementation request from the client, schedule the at least a portion of the task in accordance with the execution plan.

18. The storage medium as recited in claim 17, wherein the instructions when executed on the one or more processors:
implement a programmatic interface allowing the client to submit the task execution query,
wherein the task execution query is received via the programmatic interface.

19. The storage medium as recited in claim 17, wherein the specification comprises an indication that the task comprises one or more compute sub-tasks, wherein each sub-task of the one or more compute sub-tasks comprises an execution on a computing device of an executable component specified for the compute sub-task.

20. The storage medium as recited in claim 17, wherein the specification comprises an indication that the task comprises one or more data transfer operations, wherein each operation of the one or more data transfer operations comprises a transfer of a specified data set from a source to a destination, wherein at least one of the source and destination of a particular data transfer operation of the one or more data transfer operations comprises the resource.

21. The storage medium as recited in claim 17, wherein the specification has an associated budget constraint of the client, wherein the execution plan is based at least in part on the associated budget constraint.

22. The storage medium as recited in claim 17, wherein the instructions when executed on the one or more processors:
receive a second task execution query comprising a second specification of a second task to be performed for a client using one or more resources of the plurality of resources, wherein the second specification has an associated deadline for completion of the second task, and wherein the second task execution query comprises a request for an estimated cost of completion of the second task in accordance with the associated deadline; and
in response to receiving the second task execution query, generating an estimated cost of completion of the second task, based at least in part on pricing policies of one or more resources of the plurality of resources and an analysis of the second specification.

23. A system, comprising:
a plurality of computing devices configured to implement a plurality of resources of a provider network, wherein the plurality of resources are organized into a plurality of resource pools, wherein each resource pool of the plurality of resource pools has an associated pricing policy and an associated resource usage interruptibility policy, wherein at least one of the plurality of resource pools has a different resource usage interruptibility policy than another one of the plurality of resource pools; and
one or more computing devices configured to implement a resource manager;
wherein the resource manager is configured to:
receive a task execution query comprising a specification of a task to be performed for a client using one or more resources of the plurality of resources, wherein the query comprises a request to generate a lowest-estimated-cost execution plan for the task;
determine an interruptibility characteristic of at least a portion of the task, wherein the interruptibility characteristic describes a suitability of the at least a portion of the task for being interrupted;
in response to receiving the task execution query and determining the interruptibility characteristic of the at least a portion of the task, generate an execution plan for the task, wherein the execution plan comprises using a resource of a selected resource pool to perform the at least a portion of the task, wherein the resource pool is selected based at least in part on the associated pricing policy of the resource pool, the associated resource usage interruptibility policy of the resource pool, and the interruptibility characteristic of the at least a portion of the task;
provide an indication of an estimated cost of the plan to the client; and
in response to a task implementation request from the client, schedule the at least a portion of the task using a particular resource from the selected resource pool.

24. A system, comprising:
a plurality of computing devices configured to implement a plurality of resource instances of a provider network; and
one or more computing devices configured to implement a resource manager;
wherein the resource manager is configured to:
receive a task execution query comprising a specification of a task to be performed for a client using one or more of: (a) at least a specified number of resource instances of the plurality of resources, or (b) a network transfer of at least a specified data set;

determine an interruptibility characteristic of at least a portion of the task, wherein the interruptibility characteristic describes a suitability of the at least a portion of the task for being interrupted;

in response to receiving the task execution query and determining the interruptibility characteristic of the at least a portion of the task, generate an execution plan for the task, wherein the execution plan comprises using one or more resource instances of the plurality of resource instances to perform the at least a portion of the task, wherein the one or more resource instances are selected based at least in part on respective pricing policies of the one or more resource instances, respective resource usage interruptibility policies of the one or more resource instances, and the interruptibility characteristic of the at least a portion of the task, wherein at least one of the plurality of resources has a different resource usage interruptibility policy than another one of the plurality of resource instances; and in response to a task implementation request from the client, schedule the at least a portion of the task using the one or more resource instances.

* * * * *